(12) United States Patent
Burca et al.

(10) Patent No.: US 9,354,722 B2
(45) Date of Patent: May 31, 2016

(54) LOW POWER MANAGEMENT OF MULTIPLE SENSOR INTEGRATED CHIP ARCHITECTURE

(71) Applicant: Motorola Mobility LLC, Libertyville, IL (US)

(72) Inventors: Gabriel B Burca, Palatine, IL (US); Douglas A Lautner, Round Lake, IL (US); Scott P Debates, Crystal Lake, IL (US); Mary K Hor-Lao, Vernon Hills, IL (US); Eric J Hefner, Gurnee, IL (US); Ryan D Jones, Buffalo Grove, IL (US); Daniel T Moore, Arlington Heights, IL (US); Robert Wiegand, Arlington Heights, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 209 days.

(21) Appl. No.: 13/930,473

(22) Filed: Jun. 28, 2013

(65) Prior Publication Data

US 2014/0351558 A1    Nov. 27, 2014

Related U.S. Application Data

(60) Provisional application No. 61/827,458, filed on May 24, 2013.

(51) Int. Cl.
  *G06F 1/32* (2006.01)
  *G06F 3/0346* (2013.01)
  *H04W 52/02* (2009.01)

(52) U.S. Cl.
  CPC .............. *G06F 3/0346* (2013.01); *G06F 1/324* (2013.01); *G06F 1/3206* (2013.01); *G06F 1/3293* (2013.01); *H04W 52/0251* (2013.01)

(58) Field of Classification Search
  CPC ....... G06F 1/3206; G06F 1/324; G01C 21/20; H04W 52/0251; H04W 52/0254
  See application file for complete search history.

(56) References Cited

U.S. PATENT DOCUMENTS

| 5,874,942 A | 2/1999 | Walker |
| 6,636,521 B1 | 10/2003 | Giulianelli et al. |

(Continued)

FOREIGN PATENT DOCUMENTS

| WO | 9837484 A1 | 8/1998 |
| WO | 2006016690 A1 | 2/2006 |

(Continued)

OTHER PUBLICATIONS

International Search Report and Written Opinion issued in PCT/US2013/071299 on Dec. 10, 2014.

(Continued)

*Primary Examiner* — Albert Wang
(74) *Attorney, Agent, or Firm* — Morris & Kamlay LLP

(57) ABSTRACT

A method, device, system, or article of manufacture is provided for low-power management of multiple sensor chip architecture. In one embodiment, a method comprises, at a computing device that includes a first processor, a second processor and a third processor, receiving, by the first processor operating at a first clock rate, first sensor data from a first sensor operating at a first data rate; determining, by the first processor, a movement of the computing device using the first sensor data; in response to determining the movement of the computing device, performing, by the first processor, a first motion state algorithm to determine whether a modality of the computing device is a first motion state; and, in response to determining that the modality of the computing device is not the first motion state, changing, by the first processor, at least one of the first processor to operate at a second clock rate sufficient to perform a second motion state algorithm and changing the first sensor to operate at a second data rate sufficient to perform the second motion state algorithm, wherein the second motion state algorithm is used to determine whether the modality of the computing device is a second motion state.

19 Claims, 20 Drawing Sheets

(56) References Cited

U.S. PATENT DOCUMENTS

| | | | |
|---|---|---|---|
| 7,359,713 | B1 | 4/2008 | Tiwari |
| 7,626,499 | B2 | 12/2009 | Burneske et al. |
| 7,907,838 | B2 | 3/2011 | Nasiri et al. |
| 8,103,288 | B2 | 1/2012 | Alizadeh-Shabdiz et al. |
| 8,319,685 | B2 | 11/2012 | Maynard et al. |
| 8,638,230 | B2 | 1/2014 | Chang et al. |
| 9,135,802 | B2 | 9/2015 | Li et al. |
| 2003/0033066 | A1 | 2/2003 | Farmer et al. |
| 2003/0085870 | A1 | 5/2003 | Hinckley et al. |
| 2005/0090972 | A1 | 4/2005 | Bodin et al. |
| 2005/0257078 | A1 | 11/2005 | Bose et al. |
| 2006/0155818 | A1 | 7/2006 | Odenwald et al. |
| 2007/0142064 | A1 | 6/2007 | Gutowski et al. |
| 2008/0140338 | A1 | 6/2008 | No et al. |
| 2008/0158154 | A1 | 7/2008 | Liberty et al. |
| 2009/0088204 | A1 | 4/2009 | Culbert et al. |
| 2009/0219209 | A1 | 9/2009 | Bush et al. |
| 2010/0127968 | A1 | 5/2010 | Kramer et al. |
| 2010/0179758 | A1 | 7/2010 | Latif et al. |
| 2010/0194632 | A1 | 8/2010 | Raento et al. |
| 2010/0255856 | A1 | 10/2010 | Kansal et al. |
| 2011/0050503 | A1 | 3/2011 | Fong et al. |
| 2011/0140772 | A1 | 6/2011 | Sengupta et al. |
| 2012/0013468 | A1 | 1/2012 | Olah |
| 2012/0064951 | A1 | 3/2012 | Agevik et al. |
| 2012/0112958 | A1 | 5/2012 | Alizadeh-Shabdiz et al. |
| 2012/0252425 | A1 | 10/2012 | Moeglein et al. |
| 2012/0268249 | A1 | 10/2012 | Kansal et al. |
| 2012/0289244 | A1 | 11/2012 | Goyal et al. |
| 2012/0316471 | A1 | 12/2012 | Rahman et al. |
| 2013/0090151 | A1 | 4/2013 | Ngai et al. |
| 2013/0093627 | A1 | 4/2013 | Cosman et al. |
| 2013/0103212 | A1* | 4/2013 | Andiappan .......... 700/286 |
| 2013/0244686 | A1 | 9/2013 | Saha et al. |
| 2013/0288718 | A1 | 10/2013 | Macgougan et al. |
| 2013/0314238 | A1 | 11/2013 | Li et al. |
| 2014/0025975 | A1* | 1/2014 | Namgoong et al. ...... 713/323 |
| 2014/0118153 | A1 | 5/2014 | Li et al. |
| 2014/0141795 | A1 | 5/2014 | Abraham et al. |
| 2014/0149754 | A1 | 5/2014 | Silva et al. |

FOREIGN PATENT DOCUMENTS

| | | |
|---|---|---|
| WO | 2011107652 A1 | 9/2011 |
| WO | 2012061595 A1 | 5/2012 |

OTHER PUBLICATIONS

International Search Report issued in PCT/US2013/071277 on Oct. 27, 2014.

Partial International Search Report issued in application No. PCT/US2013/071291 on Jan. 29, 2015.

Kjaargaard, et al., "EnTracked: Energy-Efficient Robust Position Tracking for Mobile Devices", Proceedings of the 7th International Conference on Mobile Systems, Applications, and Services, MOBISYS '09. XP055113155, New York, New York, USA DOI: 10.1145/1555816.1555839; ISBN: 978-1-60-558566-6, Jan. 1, 2009, p. 221.

Wang, et al., "A framework of energy efficient mobile sensing for automatic user state recognition", Proceedings of the 7th International Conference on Mobile Systems, Applications, and Services, MOBISYS '09, Jan. 1, 2009, p. 179, XP055017031, New York, New York, USA.

International Search Report and Written Opinion dated Aug. 2, 2013, or PCT Application No. PCT/US2013/042494, filed May 23, 2013, pp. 1-13.

International Search Report and Written Opinion issued in application No. PCT/2013/071281 on Jan. 8, 2015.

International Search Report and Written Opinion issued in application No. PCT/2013/071299 on Dec. 10, 2014.

International Search Report and Written Opinion issued in PCT/J52013/071277 on Oct. 27, 2014.

Partial International Search Report issued in application No. PCT/2013/071291 on Jan. 29, 2015.

* cited by examiner

LOW POWER MANAGEMENT OF MULTIPLE SENSOR INTEGRATED CHIP ARCHITECTURE

CROSS-REFERENCE TO RELATED APPLICATIONS

This application claims priority to U.S. Provisional Patent Application No. 61/728,921, filed Nov. 21, 2012, entitled "LOW POWER MANAGEMENT OF MULTIPLE SENSOR CHIP ARCHITECTURE," U.S. Provisional Patent Application No. 61/776,868, filed Mar. 12, 2013, entitled "LOW POWER MANAGEMENT OF MULTIPLE SENSOR CHIP ARCHITECTURE," and U.S. Provisional Patent Application No. 61/827,458, filed May 24, 2103, entitled "LOW POWER MANAGEMENT OF MULTIPLE SENSOR CHIP ARCHITECTURE," all of which the contents are hereby incorporated by reference as if fully set forth below.

FIELD OF USE

The embodiments described herein relate to multiple and varied communication sensors within an integrated chip architecture and more particularly to managing sensor data from the multiple and varied communication sensors.

BACKGROUND

In today's sophisticated computing devices such as mobile computing devices, smartphones, tablet computers, and wearable computing devices many internal sensors are employed within the computing device. Some of these sensors aid determination of contextual conditions for the computing device. Other sensors aid determination of geographical location for the computing device. In this regard, some sensors are better suited for indoor use than outdoor use and vice versa.

Users of these sophisticated computing devices have come to rely heavily on the accuracy, robustness, and availability of these sensors within their computing devices whether they actively know it or not. There exists a wide range of different sensors and sensory types, for example: global navigation satellite system (GNSS) sensors such as global positioning satellite (GPS) sensors, global navigation satellite system (GLONASS) sensors and the like, and short range wireless sensors such as WiFi sensors, near field communication (NFC) sensors, Bluetooth sensors, radio frequency identification (RFID) sensors and the like. In addition there can be sensors involving motion such as accelerometers, gyroscopes, magnetometers, as well as other micro-electro-mechanical system devices (MEMS). Imaging sensors, microphone sensors, and proximity sensors may also be employed within a sophisticated computing device. Further, a sensor may include a modem, a transceiver, a processor, and the like.

Furthermore, computing devices are typically battery operated and, as such, power consumption is an important feature in marketing these devices. Many computing devices are capable of entering a low power state to conserve battery power. During the low power state, most of the resources of the computing device are powered down resulting in limited capability of the device. Accordingly, there is a need for improved techniques to allow for low power management of multiple sensors in an integrated chip architecture for a computing device while, for instance, the computing device is in a low power state. Furthermore, other desirable features and characteristics of the present disclosure will become apparent from the subsequent detailed description and claims, taken in conjunction with the accompanying figures and the foregoing technical field and background.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1A:
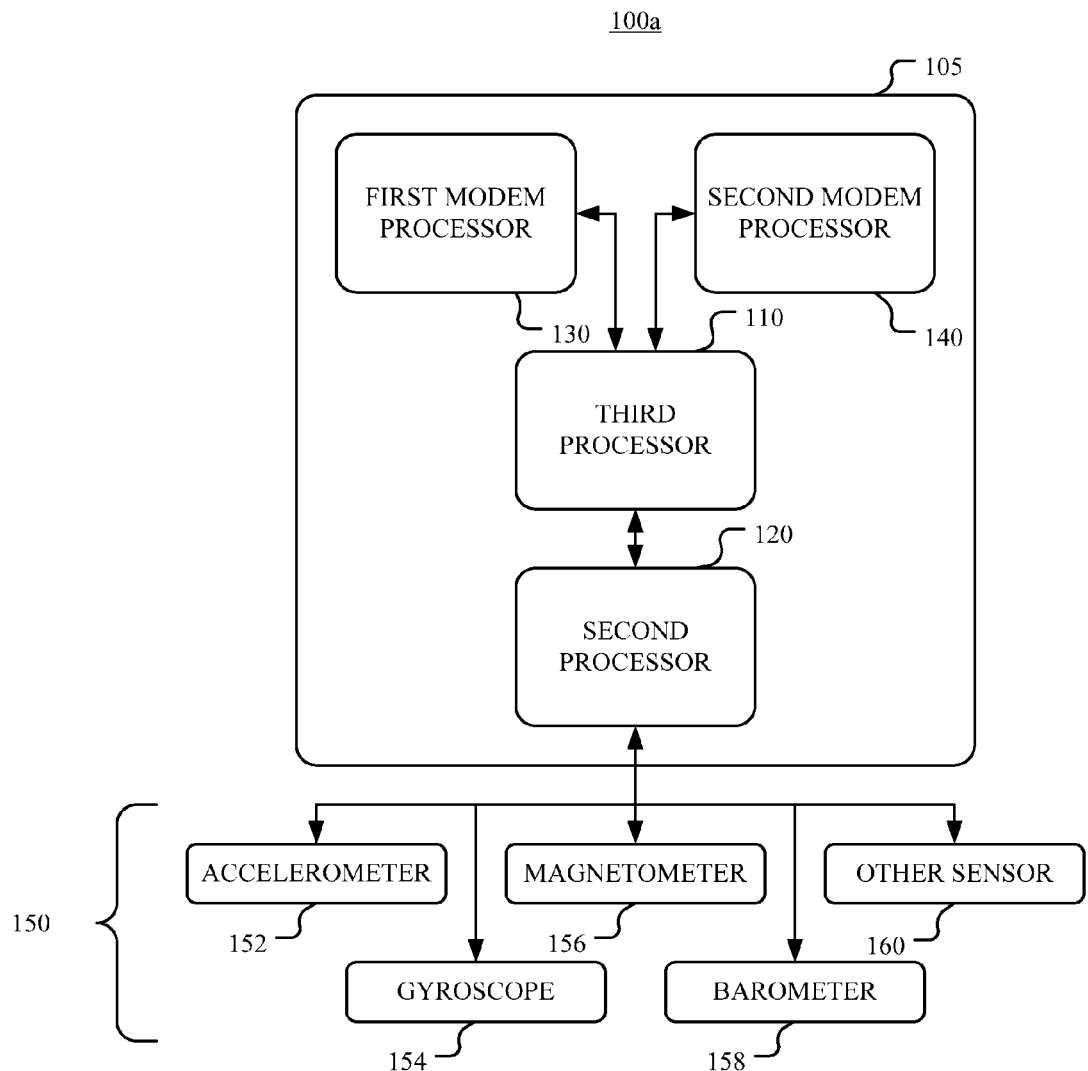
FIG. 1A is a block diagram illustrating one embodiment of a multiple sensor integrated chip architecture for a computing device in accordance with various aspects set forth herein.

Described herein is a method for managing processor analysis of multiple sensors in a computing device that includes monitoring a first sensor signal that may be coupled to a sensor hub processor and thereafter comparing the first monitored sensor signal with a predetermined signature for establishing a confidence relationship associated with received sensor signaling from multiple sensors. Alternatively, the first monitored sensor signal may simply be compared with the predetermined signature.

In addition, the efficacy of operation for the multiple sensors may be determined; and a second sensor signal that is coupled to a low power core may be monitored. The second monitored sensor signal may be compared with another predetermined signature for establishing a confidence relationship associated with received sensor signaling from multiple sensors. The method confirms that one or more sensors has met a predetermined confidence state.

In one embodiment, a short range wireless subsystem may be coupled to a low power core. That is one or more application programming interfaces (APIs) may exist between the WiFi subsystem and the low power core to monitor and operate on WiFi scan results such as: received signal strength indicator (RSSI), service set identifier (SSID), basic service set identifier (BSSID), a trigger that an SSID matches a stored SSID, or a trigger that a BSSID matches a stored BSSID. This methodology can provide a low power geofence for points of interest to a mobile computing device user. Additionally, the APIs may also comprise means for determining modem connectivity status.

In another embodiment also involving a short range wireless subsystem coupled to a low power core, a location manager and location determination engine may reside within the low power core. Such an architecture can be employed to have the location determination engine produce a geolocation (based on latitude, longitude, elevation/floor, and confidence, for example) using WiFi AP database including metadata.

Another embodiment couples a satellite positioning sensor such as a GNSS subsystem to the low power core. The GNSS subsystem may include a GPS subsystem or a GLONASS subsystem. Several application programming interfaces (APIs) may be configured to monitor satellite passing patterns to determine latitude, longitude, velocity, positional accuracy versus uncertainty, and scan rate. The scan rates can be either receiver scan rate or a reporting scan rate.

For yet another embodiment, an application processor is directly coupled to the low power core to enable programmability of a short range wireless subsystem. The programmability may determine starting and stopping of a short range wireless scan such as a WiFi scan, and the rate of the short range wireless scan.

Furthermore, this disclosure describes example embodiments of determining a modality of a user's activities while in possession of a computing device. A modality may also be referred to as a context state. The modality of the user's activities may be determined by collecting sensor data on the computing device and inferring activities associated with the user of the computing device by extracting features from the sensor data to determine a modality of the user's activities. The inferred activities may include motion states, location states, environment states, communication states, other states, or any combination thereof. While a modality may be a motion state, an environment state, a communication state or another state, a modality may also be determined using any combination of these states. Motion states may be associated with a movement (or lack thereof) of a user in possession of the computing device and may include being stationary, walking, jogging, running, driving a vehicle, riding on a vehicle such as a car, bus or plane, riding an escalator or elevator, the like, or any combination thereof. Motion states may use sensor data from an accelerometer sensor, a gyroscope, or the like. Location states may be associated with the location of a user in possession of the computing device. Location states may use sensor data from a GNSS sensor such as a GPS sensor or a GLONASS sensor, a short range wireless sensor such as a WiFi sensor, or the like. Environment states may be associated with the environment surrounding a user in possession of a computing device. Environment states may use sensor data from a microphone or the like. Communication states may be associated with man-made sounds such as speech made in the proximity of a user in possession of a computing device. Further, this disclosure describes example embodiments of partitioning functions associated with determining a modality of a user's activities amongst various processors of the computing device with the effect of reducing power consumption by the computing device.

Figure 1B:
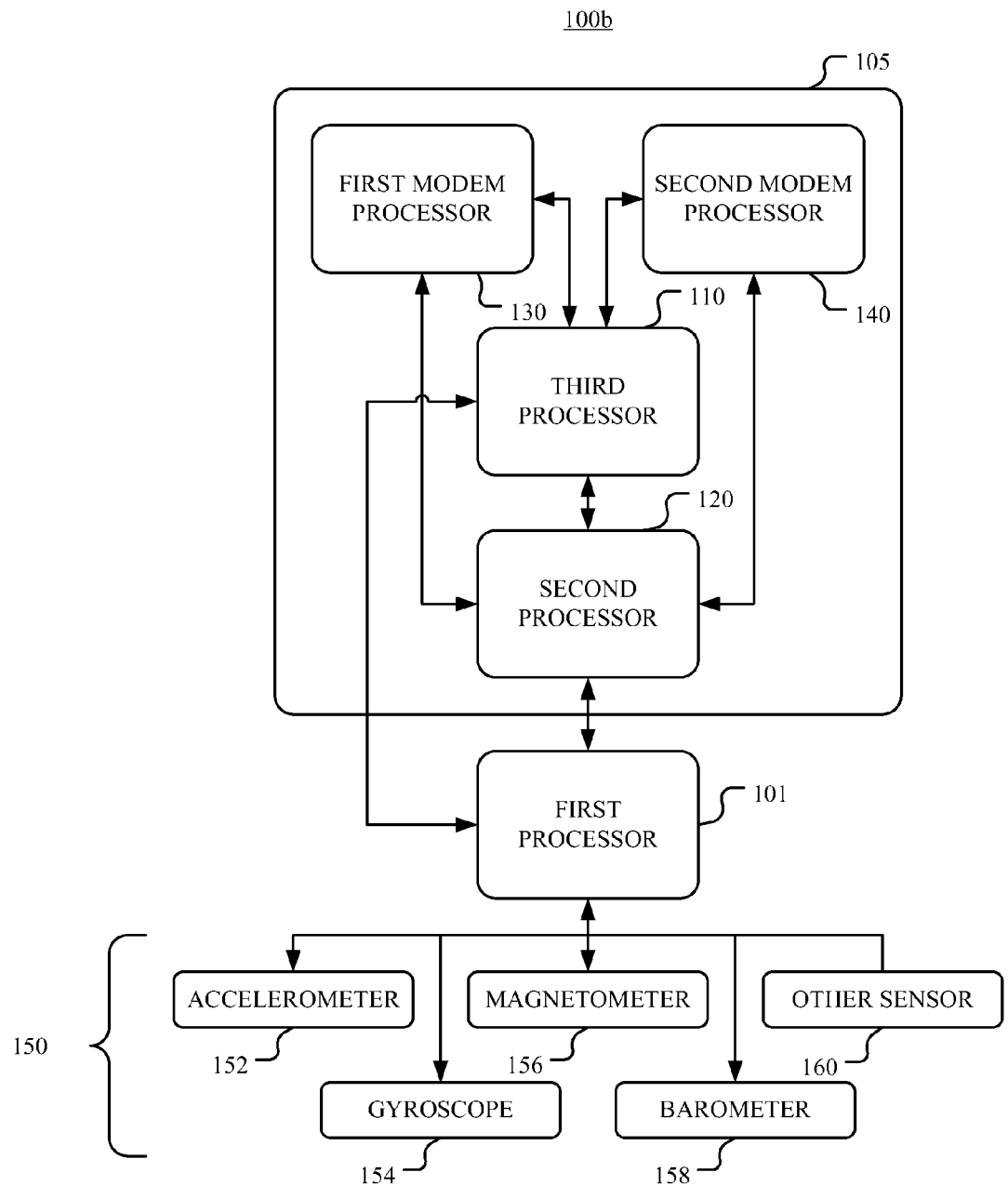
FIG. 1B is a block diagram illustrating another embodiment of a multiple sensor integrated chip architecture for a computing device in accordance with various aspects set forth herein.

According to one example implementation, the terms computing device or mobile computing device, as used herein, may be a central processing unit (CPU), controller or processor, or may be conceptualized as a CPU, controller or processor (for example, the first processor 101 of FIG. 1B). In yet other instances, a computing device may be a CPU, controller or processor combined to one or more additional hardware components. In certain example implementations, the computing device operating as a CPU, controller or processor may be operatively coupled with one or more peripheral devices, such as a display, navigation system, stereo, entertainment center, WiFi access point (AP), or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over short range wireless such as WiFi) such as a TV or an external computing system.

FIG. 1A is a block diagram illustrating one embodiment of a multiple sensor integrated chip architecture 100a for a computing device in accordance with various aspects set forth herein. In FIG. 1A, the architecture 100a may be configured to include a second processor 120, a third processor 110, a first modem processor 130, a second modem processor 140, and a peripheral subsystem 150. Each of the second processor 120 and the third processor 110 may be configured to process computer instructions and data. Further, each processor may be configured to be a computer processor or a controller. In one example, the second processor 120 may be a processor such as a low power core (LPC). In another example, the third processor 110 may be an application processor and may include multiple computer processors. Various components of the architecture 100a may be combined into a single integrated circuit architecture comprised of silicon or some other suitable material for employing high-rate chip technology. In one example, a single chip architecture 105 may be configured to include the second processor 120, the third processor 110, the first modem processor 130 and the second modem processor 140.

In FIG. 1A, the third processor 110 may be operationally coupled to the second processor 120, the first modem processor 130, and the second modem processor 140. In one example, the first modem processor 130 may be configured to receive or transmit data signals associated with a GNSS system such as GPS or GLONASS. In one example, the second modem processor 140 may be configured to receive or transmit data signals corresponding to short range wireless signals such as WiFi signals, Bluetooth signals, FM radio signals, another communication protocol, or any combination thereof. Other modem processors may be contemplated as being operationally coupled to the third processor 110 or the second processor 120, such as those modem processors capable of sending or receiving data signals for a radio frequency identification (RFID) communication protocol, a near field communication (NFC) protocol, a local-area network (LAN) protocol, a wide-area network (WAN) protocol, a computer network protocol, a wireless network protocol, a telecommunications network protocol, another like communication protocol signals, or any combination thereof. The second processor 120 may be capable of receiving or transmitting sensory data from the peripheral subsystem 150. The peripheral subsystem 150 may be configured to include an accelerometer 152, a gyroscope 154, a magnetometer 156, a barometer 158, and another sensor 160 such as an ambient light sensor (ALS), a proximity sensor or an odor sensor, or any combination thereof.

FIG. 1B is a block diagram illustrating one embodiment of a multiple sensor integrated chip architecture 100b for a computing device in accordance with various aspects set forth herein. In FIG. 1B, the architecture 100b may be configured to include a first processor 101, a second processor 120, a third processor 110, a first modem processor 130, a second modem processor 140, and a peripheral subsystem 150. Each of the first processor 101, the second processor 120, and the third processor 110 may be configured to process computer instructions and data. Further, each processor may be configured to be a computer processor or a controller. In one example, the first processor 101 may be a controller such as a sensor hub. In another example, the second processor 120 may be a processor such as an LPC. In another example, the third processor 110 may be an application processor and may include multiple computer processors. Various components of the architecture 100b may be combined into a single integrated circuit architecture comprised of silicon or some other suitable material for employing high-rate chip technology. In one example, a single chip architecture 105 may be configured to include the second processor 120, the third processor 110, the first modem processor 130 and the second modem processor 140.

In FIG. 1B, the third processor 110 may be operationally coupled to the first processor 101, the second processor 120, the first modem processor 130, and the second modem processor 140. In one example, the first modem processor 130 may be configured to receive or transmit data signals associated with a GNSS system such as GPS or GLONASS. In one example, the second modem processor 140 may be configured to receive or transmit data signals corresponding to short range wireless signals such as WiFi signals, Bluetooth signals, FM radio signals, another communication protocol signals, or any combination thereof. Other modem processors may be contemplated as being operationally coupled to the third processor 110 or the second processor 120, such as those modem processors capable of sending or receiving data signals for a radio frequency identification (RFID) communication protocol, a near field communication (NFC) protocol, a local-area network (LAN) protocol, a wide-area network (WAN) protocol, a computer network protocol, a wireless network protocol, a telecommunications network protocol, another like communication protocol or any combination thereof. The second processor 120 may be coupled to the third processor 110, the first modem processor 130, the second modem processor 140, and the first processor 101. The peripheral subsystem 150 may be configured to include an accelerometer 152, a gyroscope 154, a magnetometer 156, a barometer 158, another sensor 160 such as an ambient light sensor (ALS), a proximity sensor or an odor sensor, or any combination thereof. The first processor 101 may also be configured to receive input data from a digital signal processor (DSP) operationally coupled to a microphone, for example.

In FIG. 1B, the first processor 101 may be operationally coupled to the third processor 110, the peripheral subsystem 150 and the second processor 120. Further, the first processor 101 may be operationally coupled to an accelerometer 152, a gyroscope 154, a magnetometer 156, a barometer 158, or another sensor 160. The architecture 100b may allow for the first processor 101 to receive motion data, location data or modality data from the peripheral subsystem 150 while the second processor 120 and the third processor 110 are in a low power state such as a standby mode or a sleep mode. Further, the architecture 100b may allow motion data, location data or modality data to be received by the second processor 120 while the third processor 110 is in a low power state such as a standby mode or a sleep mode. In one example, the first processor 101 may receive motion data from the peripheral subsystem 150 and may determine whether the computing device is moving or stationary. In response to detecting motion, the first processor 101 may activate the second processor 120. In one example, a processor may activate another processor or electronic component by providing it with power. In another example, a processor may activate another processor or electronic component by initializing or interrupting the other processor or electronic component. In another example, a processor may activate another processor or electronic component by changing an operating state of the other processor or electronic component. The second processor 120 may receive location data from the first modem processor 130 such as GNSS location data or from the second modem processor 140 such as short range wireless location data such as WiFi location data to determine a modality of the computing device. In response to determining a particular modality, the first processor 101 or the second processor 120 may activate the third processor 110.

In another embodiment, the third processor 110 may only be operatively coupled to the first modem processor 130 or the second modem processor 140 using the second processor 120. This configuration may allow, for example, phone calls or data transmission over the Internet without waking the third processor 110.

In another embodiment, any sensors having an active mode current of less than one milliamp (1 mA) measured during the determination of one sample are operationally coupled to the first processor 101. Further, any sensors having an active mode current of at least one milliamp (1 mA) measured during the determination of one sample are operationally coupled to the second processor 120.

In another embodiment, any sensors having an active mode current of less than ten milliamps (10 mA) measured during the determination of one sample are operationally coupled to the first processor 101. Further, any sensors having an active mode current of at least ten milliamps (10 mA) measured during the determination of one sample are operationally coupled to the second processor 120.

Figure 2:
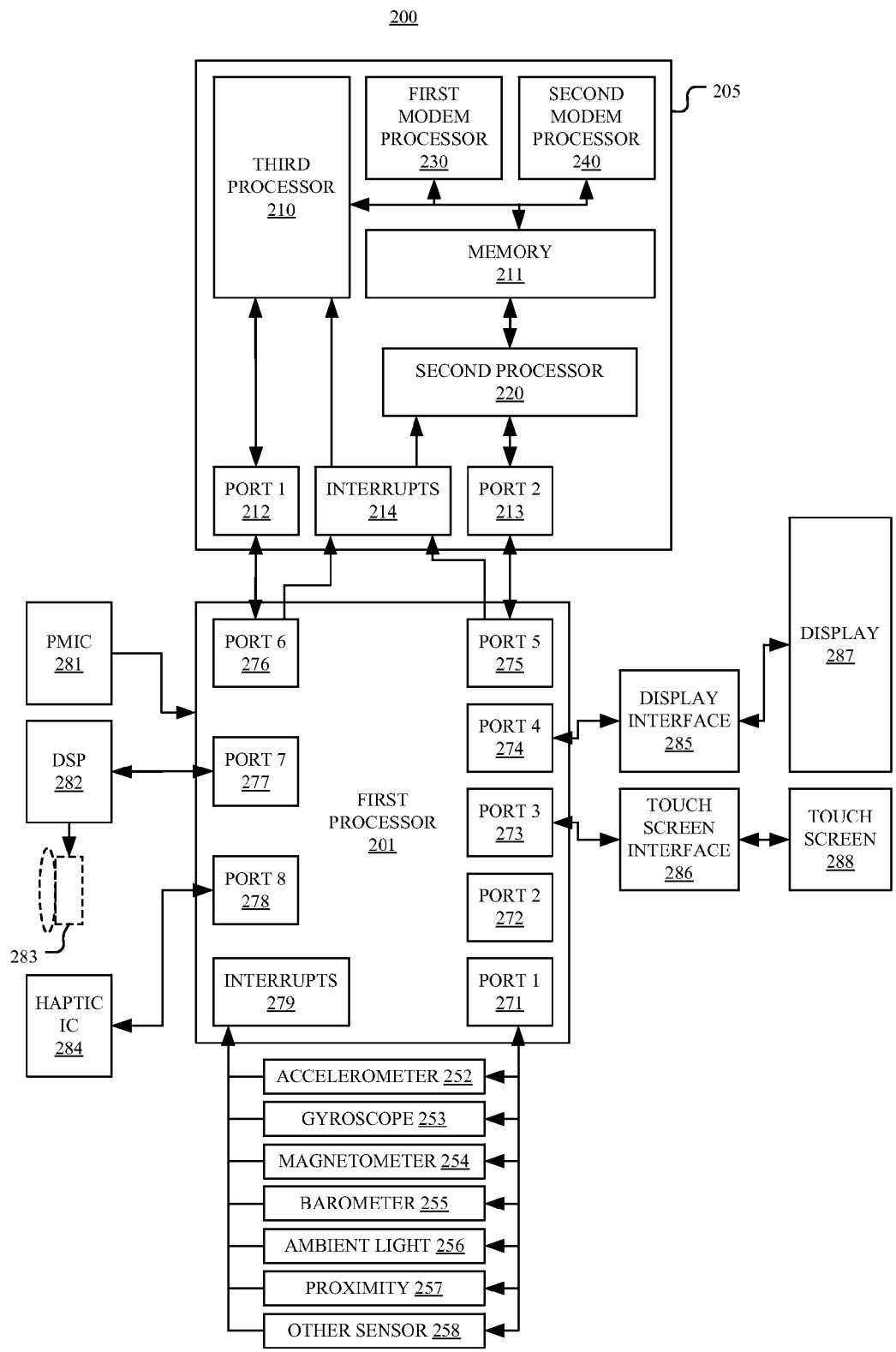
FIG. 2 is a block diagram illustrating another embodiment of a multiple sensor integrated chip architecture for a computing device in accordance with various aspects set forth herein.

FIG. 2 is a block diagram illustrating another embodiment of a multiple sensor integrated chip architecture 200 for a computing device in accordance with various aspects set forth herein. In FIG. 2, the architecture 200 may be configured to include a first processor 201, a second processor 220, and a third processor 210. Each of the first processor 201, the second processor 220, and the third processor 210 may be configured to process computer instructions and data. Further, each processor may be configured to be a computer processor or a controller. In one example, the first processor 201 may be a controller such as a sensor hub. In another example, the second processor 220 may be a processor such as an LPC. In another example, the third processor 210 may be an application processor and may include multiple computer processors. In one definition, data is information in a form suitable for use by a computer. It is important to note that a person having ordinary skill in the art will recognize that the subject matter of this disclosure may be implemented using various operating systems or combinations of operating systems.

In FIG. 2, the first processor 201 may be configured to include interface ports 271 to 278, an interrupt controller 279, other elements, or any combination thereof. The interface ports 271 to 278 of the first processor 201 may be a serial port, a multi-master serial single-ended computer bus port such as an I²C port, a serial peripheral interface (SPI) port, a parallel port, a general purpose input and output (GPIO) port, a game port, a universal serial bus (USB), a micro-USB port, a high definition multimedia interface (HDMI) port, a video port, an audio port, a short range wireless port such as a Bluetooth port, an NFC port, a WiFi port or the like, a GNSS port, another like interface port, or any combination thereof. The interrupt controller 279 may be used to provide a software interface between the first processor 201 and the interrupt hardware. The interface port 271 may be used to operatively couple the first processor 201 to an accelerometer sensor 252, a gyroscope sensor 254, a magnetometer sensor 256, a barometer sensor 258, an ambient light sensor 256, a proximity sensor 257, another sensor 258 such as an ambient light sensor (ALS), a proximity sensor or an odor sensor, or any combination thereof.

In the current embodiment, the interface port 274 may be used to operatively couple the first processor 201 to a display 287 using a display interface 285. The display interface 285 may be configured as a communication interface and may provide functions for rendering video, graphics, images, text, other information, or any combination thereof on the display 287. In one example, a communication interface may include a serial port, a parallel port, a general purpose input and output (GPIO) port, a game port, a universal serial bus (USB), a micro-USB port, a high definition multimedia interface (HDMI) port, a video port, an audio port, a Bluetooth port, a near-field communication (NFC) port, another like communication interface, or any combination thereof. In one example, the display interface 285 may be operatively coupled to a local display, such as a touch-screen display associated with the computing device. In another example, the display interface 285 may be configured to provide video, graphics, images, text, other information, or any combination thereof for an external/remote display that is not necessarily connected to the computing device. In one example, a desktop monitor may be utilized for mirroring or extending graphical information that may be presented on the computing device. In another example, the display interface 285 may wirelessly communicate, for example, using the first modem processor 230, the second modem processor 240, or another modem processor to an external/remote display.

In FIG. 2, the interface port 273 may be used to operatively couple the first processor 201 to a touch screen 288 using a touch screen interface 286. The display 287 may be combined with the touch screen 288 to form a touch-sensitive display. The interface port 275 may be used to operatively couple the first processor 201 to the second processor 220. The interface port 276 may be used to operatively couple the first processor 201 to the third processor 210. The interface port 277 may be used to operatively couple the first processor 201 to a digital signal processor (DSP) 282. The DSP 282 may be operatively coupled to a microphone 283 or a speaker. The interface port 278 may be used to operatively couple the first processor 201 to a haptic integrated circuit (IC) 284. The power management IC 281 may be used to provide various voltages to elements of the system. Also, the power management IC 281 may provide a clock such as thirty two kilohertz (32 KHz) to the first processor 201.

In the current embodiment, various components of the architecture 200 may be combined into a single integrated circuit architecture comprised of silicon or some other suitable material for employing high-rate chip technology. In one example, a single chip architecture 205 may be configured to include the second processor 220, the third processor 210, a first modem processor 230, a second modem processor 240, memory 211, interface ports 212 and 213, an interrupt controller 214, other element, or any combination thereof. The third processor 210 may be operatively coupled to the first modem processor 230, the second modem processor 240 and the memory 211. Further, the third processor 210 may be operatively coupled to the second processor 220 using the memory 211. Also, the third processor 210 may be operatively coupled to the first processor 201 using the interface port 212. The second processor 220 may be operatively coupled to the first modem processor 230 and the second modem processor 240 using the memory 211. Further, the second processor 230 may be operatively coupled to the first processor 201 using the interface port 213. The interrupt controller 214 may be used to provide a software interface between the second processor 220 and the interrupt hardware. Further, the interrupt controller 279 may be used to provide a software interface between the third processor 210 and the interrupt hardware.

In FIG. 2, the first modem processor 230 may be configured to receive or transmit data signals associated with a GNSS subsystem such as GPS or GLONASS satellites or with another communication protocol. The second modem processor 240 may be configured to receive or transmit data signals corresponding to short range wireless signals such as WiFi signals, Bluetooth signals, FM radio signals, another communication protocol signals, or any combination thereof. Other modem processors may be contemplated as being operationally coupled to the third processor 210 or the second processor 220. The other modem processors may include modem processors capable of sending or receiving data signals for an RFID, an NFC, a local-area network (LAN), a wide-area network (WAN), a computer network, a wireless network, a telecommunications network, another like network or any combination thereof. The communication functions of these other modem processors may include data communication, voice communication, multimedia communication, short-range communications, near-field communication, another like communication function, or any combination thereof. For example, another modem processor may include cellular communication.

In this embodiment, the memory 211 may provide storage or caching of data or computer instructions during the execution of software programs such as the operating system, application programs, device drivers and firmware. The memory 211 may be configured to include memory such as random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the memory 211 may be configured to include an operating system, an application program such as a web browser application, a widget or gadget engine or another application, a data file and RAM. The memory 211 may also be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The memory 211 may allow the second processor 220 or the third processor 210 to access computer-executable instructions, application programs or the like, stored on transitory or non-transitory memory media, to off-load data, or to upload data. An article of manufacture, such as one utilizing a communication system may be tangibly embodied in a storage medium, which may comprise a computer-readable medium.

Figure 3:
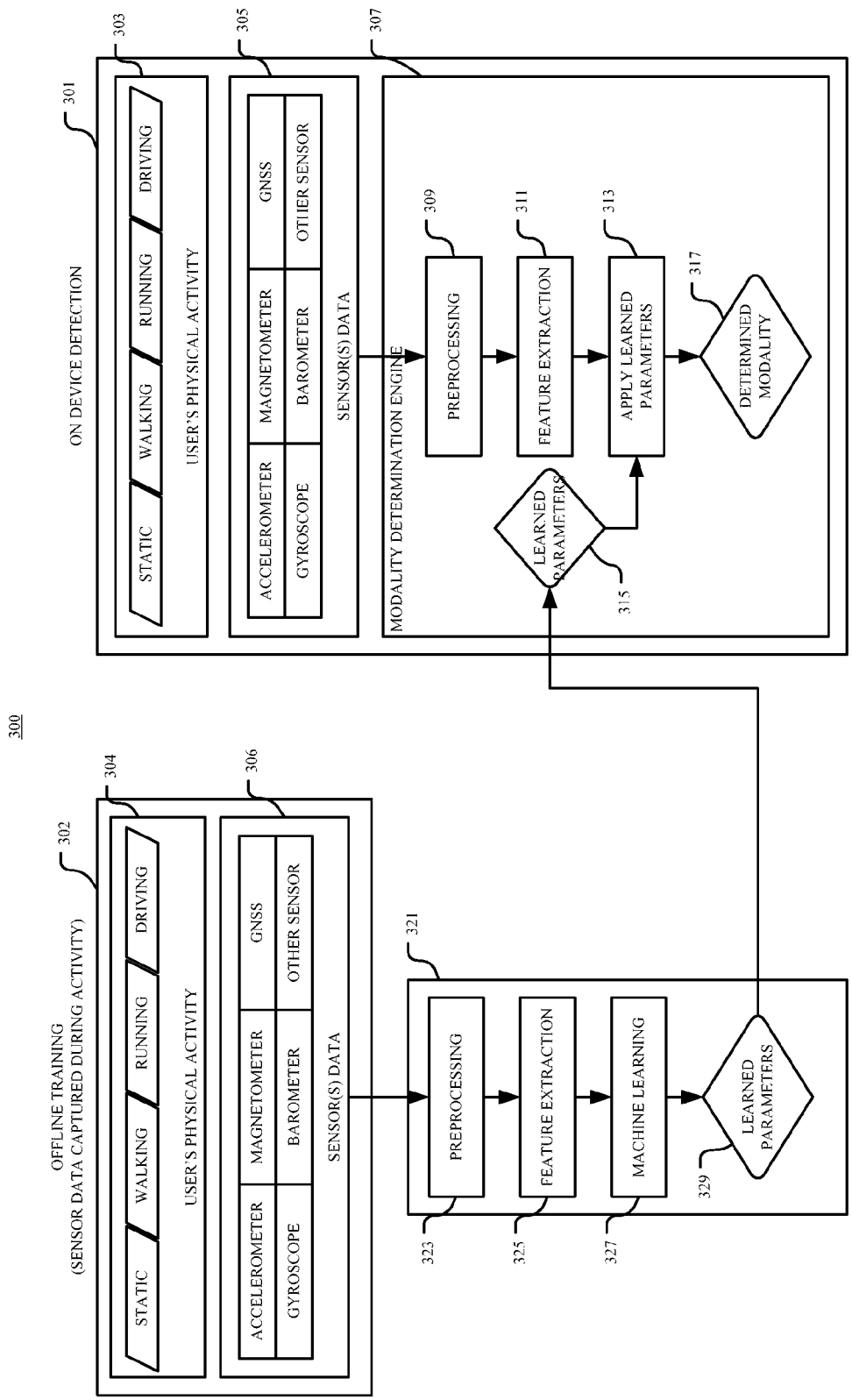
FIG. 3 is a block diagram illustrating a system for performing contextual engine training with various aspects described herein.

FIG. 3 is a block diagram illustrating a system 300 for performing contextual engine training with various aspects described herein. In FIG. 3, the system 300 may be configured to include a first computing device 301, a second computing device 302 and an offline processor 321. The system 300 may conduct the contextual engine training offline using the second computing device 302. The second computing device 302 may capture sensory data 306 during a particular user physical activity 304. The computing device 302 may collect the sensory data 306 from sensors within the computing device 302. The user physical activity 304 may include stationary, walking, running, driving, or other type of physical activity. The internal sensors of the computing device 302 may include an accelerometer, a magnetometer, a GNSS sensor such as a GPS sensor, a short range wireless sensor such as a WiFi sensor, a barometer sensor, a gyroscope, a microphone, or other like sensor. The computing device 302 may provide the sensory data 306 to the offline processor 321. In one example, the offline processor may be a computer server having access to a network such as the Internet. In another example, the offline processor may be another computing device. In another example, the offline processor 321 may be the second computing device 302.

In FIG. 3, the offline processor 321 may be configured to include a preprocessing module 323, a feature extraction module 325, and a machine learning module 327. The offline processor 321 may perform offline training by processing the sensory data 306 to develop learned parameters 329 used as predetermined signatures for a confidence level for use by the first computing device 301. In one example, the second computing device 302 may be the same as the first computing device 301. The preprocessing module 323 may be used to extract sensor data specific to a particular activity. The feature extraction module 325 may be used to extract statistical and non-statistical information from the sensor data 306. The machine learning module 327 may be used to determine learned parameters 329 based on the extracted information. The learned parameters 329 may be directly used in a modality determination engine 307 of the computing device 301. The confidence of sensory data may be developed for greater accuracy based on the machine learning during the training stage. Two or more threshold levels of confidence may be used in the modality determination engine 307 of the computing device 301. The modality determination engine 307 may be configured to include a preprocessing module 309, a feature extraction module 311, an apply learned parameters module 313 and a determined modality module 317. In one example, a first level of confidence may include the use of the sensory data 305 associated with an accelerometer signal. In another example, a second level of confidence may include the use of the sensory data 305 associated with a short range wireless signal such as a WiFi signal or a GNSS signal such as a GPS signal when, for instance, an application processor is in an idle state. In another example, a first, second or third level of confidence may include the use of sensory data associated with a microphone, an ambient light sensor (ALS), a proximity sensor, another sensor, or any combination thereof.

Figure 4:
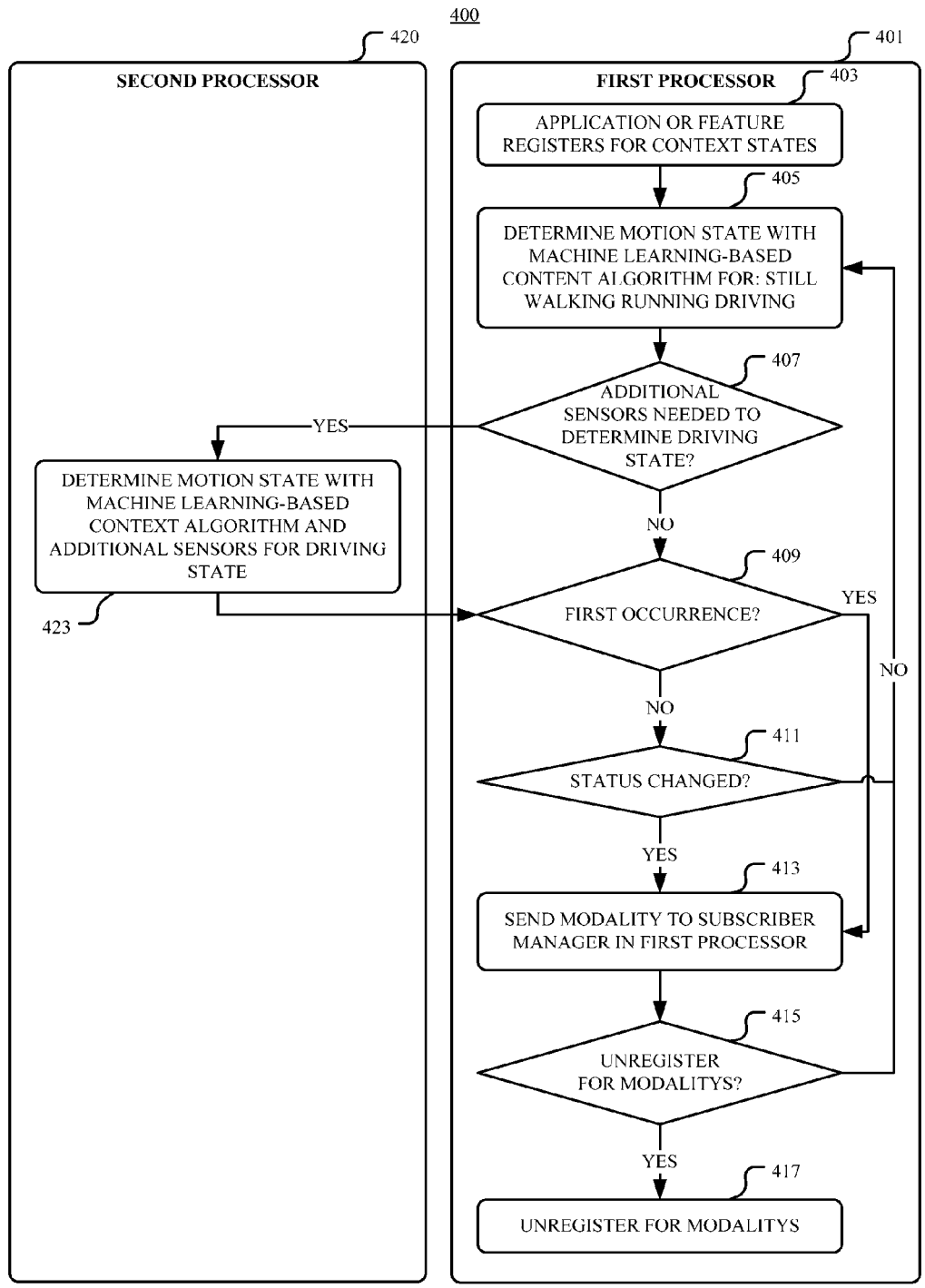
FIG. 4 is a flow chart of one embodiment of a method of determining a modality of a computing device having a multiple sensor integrated chip architecture with various aspects described herein.

FIG. 4 is a flow chart of one embodiment of a method 400 of determining a modality of a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor 401, a second processor 420, and a third processor. In one example, the first processor 401 may be a sensor hub, the second processor 420 may be an LPC, and the third processor may be an application processor. In FIG. 4, the method 400 may begin at, for instance, block 403 where the first processor 401 may receive, from an application or feature of the third processor, a request for the modality of the computing device. In response to the request for the modality of the computing device, at block 405, the method 400 may determine a motion state using a machine learning-based content algorithm and first sensor data from a first sensor. The first sensor may be at least one of an accelerometer, a magnetometer, a gyroscope, a barometer, and the like. In one example, the first sensor is an accelerometer. A person of ordinary skill in the art will recognize the structure, functions, and capabilities associated with machine learning-based content algorithms. The motion state may be, for instance, still, walking, running, driving, or the like.

In FIG. 4, at block 407, the method 400 may determine whether a second sensor is needed to provide a second level of confidence. In one example, the driving state may require the second sensor to provide a second level of confidence. The second sensor may be at least one of a GNSS sensor such as a GPS sensor and a short range wireless sensor such as a WiFi sensor. At block 423, if the second sensor is needed to provide the second level of confidence, then the method 400 may determine the motion state using the machine learning-based content algorithm and second sensor data from the second sensor. The first processor 401 may send, to the second processor 420, a request to provide the second level of confidence. Further, the first processor 401 may send, to the second processor 420, the first sensor data from the first sensor or information associated with the first level of confidence. Also, the first processor 401 may need to activate the second processor 420.

In the current embodiment, at block 409, the method 400 may determine whether the current iteration is the first time to determine the modality. At block 411, the method 400 may determine whether the modality is different from the previous modality. If the modality is different, at block 413, the method 400 may send the modality of the computing device to the third processor using, for instance, a subscriber manager element of the first processor 401. Otherwise, if the modality is the same, the method 400 may return to block 405. At block 415, the method 400 may determine whether there are any other requests for the modality of the computing device by an application or function of the second processor or the third processor. At block 417, the method 400 may unregister the request for the modality of the computing device made by the specific application or feature of the second processor or the third processor.

Figure 5:
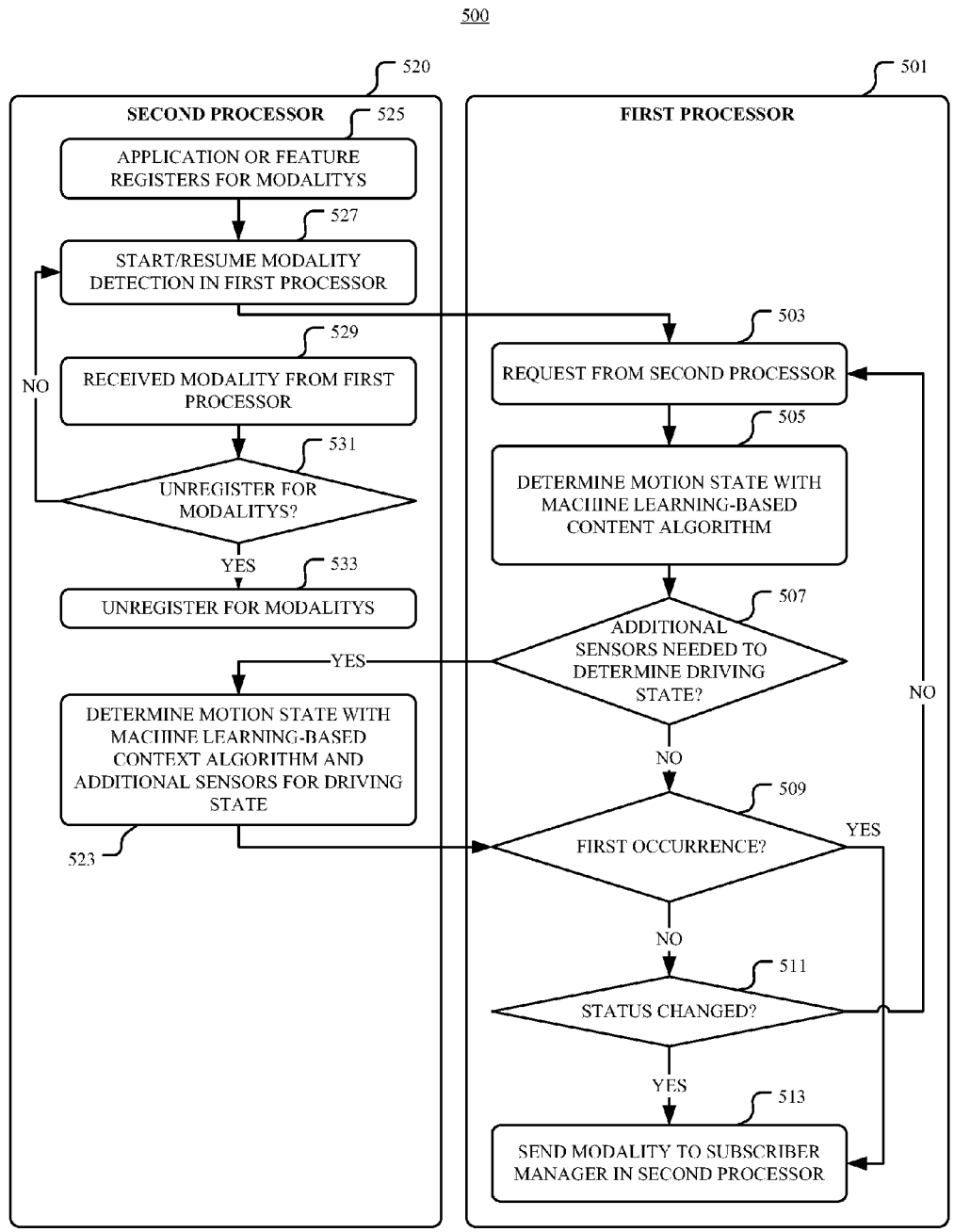
FIG. 5 is a flow chart of another embodiment of a method of determining a modality of a computing device having a multiple sensor integrated chip architecture with various aspects described herein.

FIG. 5 is a flow chart of another embodiment of a method of determining a modality of a computing device having a multiple sensor integrated chip architecture with various aspects described herein. The multiple sensor integrated chip architecture may be similar to the architecture described by FIG. 1B. Further, the multiple sensor integrated chip architecture may be configured to include a first processor 501, a second processor 520, and a third processor. In one example, the first processor 501 may be a sensor hub, the second processor 520 may be a low power core, and the third processor may be an application processor. In FIG. 5, the method 500 may begin at, for instance, block 525 where the second processor 520 may receive, from an application or feature of the third processor, a request for a modality of the computing device.

In FIG. 5, at block 527, the method 500 may start or resume the modality detection performed by the first processor 501. In response to the request to start or resume the modality detection, at block 503, the method 500 may start or resume the modality detection performed by the first processor 501. At block 505, the method 500 may determine a motion state using a machine learning-based content algorithm and first sensor data from a first sensor. The first sensor may be at least one of an accelerometer, a magnetometer, a gyroscope, a barometer, and the like. In one example, the first sensor is an accelerometer. A person of ordinary skill in the art will recognize the structure, functions, and technology associated with machine learning-based content algorithms. The motion state may be, for instance, still, walking, running, driving, or the like.

In FIG. 5, at block 507, the method 500 may determine whether a second sensor is needed to provide a second level of confidence. In one example, the driving state may require the second sensor to provide a second level of confidence. The second sensor may be at least one of a GNSS sensor such as a GPS sensor and a short range wireless sensor such as a WiFi sensor. At block 523, if the second sensor is needed to provide the second level of confidence, then the method 500 may determine the motion state using the machine learning-based content algorithm and second sensor data from the second sensor. The first processor 501 may send, to the second processor 520, a request to provide the second level of confidence. Further, the first processor 501 may send, to the second processor 520, the first sensor data from the first sensor or information associated with the first level of confidence. Also, the first processor 501 may need to activate the second processor 520.

In the current embodiment, at block 509, the method 500 may determine whether the current iteration is the first time to determine the modality. At block 511, the method 500 may determine whether the modality is different from the previous modality. If the content state is different, at block 513, the method 500 may send the modality of the computing device to, for instance, a subscriber manager element of the second processor 520. Otherwise, if the content state is the same, the method 500 may return to block 503. At block 529, the method 500 may receive the modality of the computing device from the first processor 501. At block 531, the method 500 may determine whether there are any other requests for the modality of the computing device by an application or function of the third processor. At block 533, the method 500 may unregister the request for the modality of the computing device made by a specific application or feature of the third processor.

Figure 6:
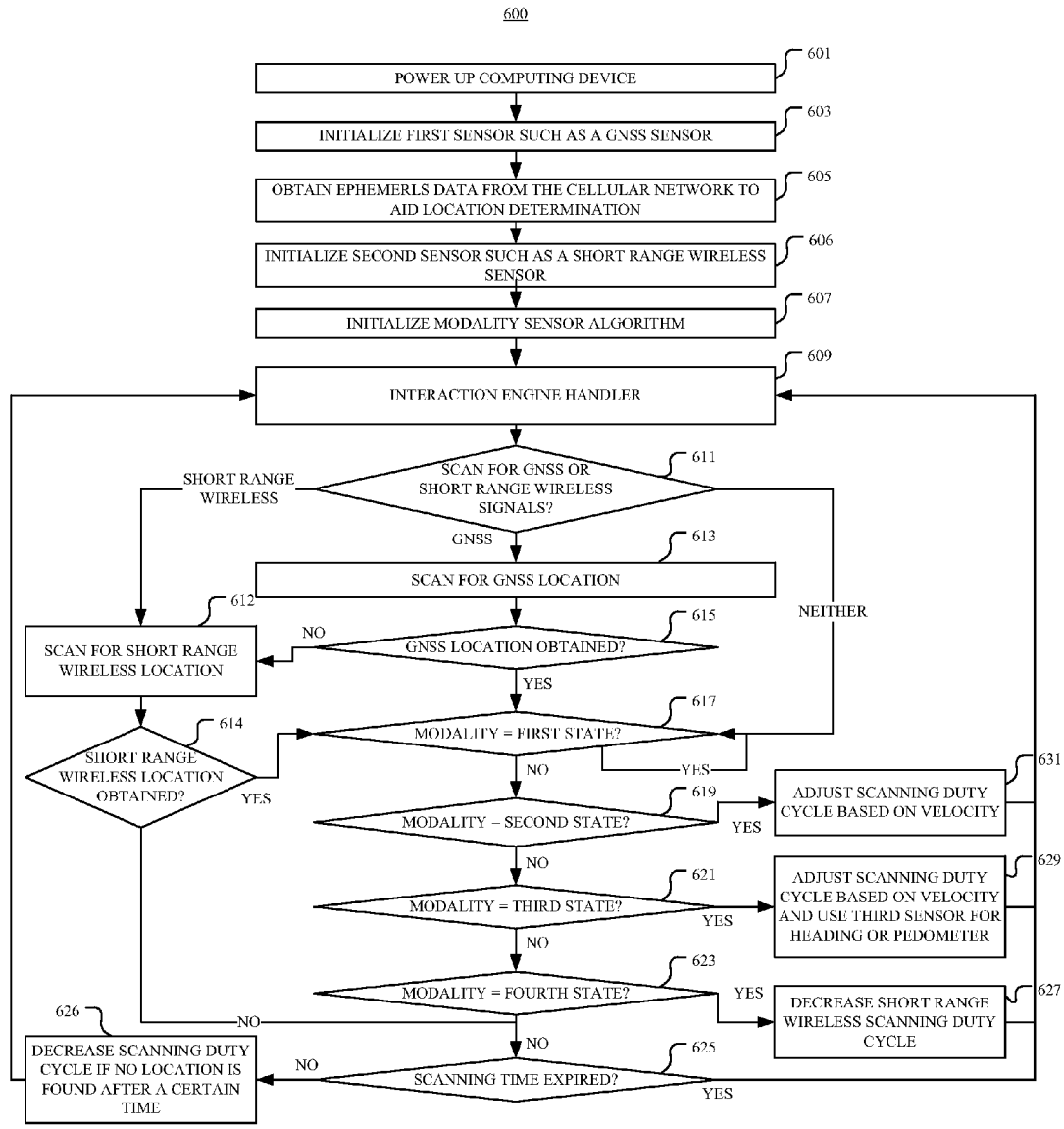
FIG. 6 is a flow chart of another embodiment of a method of determining a modality of a computing device having a multiple sensor integrated chip architecture with various aspects described herein.

FIG. 6 is a flow chart of another embodiment of a method of determining a modality of a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor, a second processor, and a third processor. In FIG. 6, the method 600 may begin at, for instance, block 601 where the computing device may be powered-up. At block 603, the method 600 may initialize a first sensor such as a GNSS sensor. At block 605, the method 600 may obtain location data such as ephemeral data to aid the first sensor. In one example, the location data may be obtained by the computing device from a cellular network or a short range wireless network such as a WiFi network.

In FIG. 6, at block 606, the method 600 may initialize a second sensor such as a short range wireless sensor. At block 607, the method 600 may initialize a modality sensor algorithm by setting, for instance, a modality to a first state such as a null state. At block 609, the method 600 may execute an interaction engine handler. The interaction engine handler may be used to execute algorithms such as the modality sensor algorithm to determine the modality of the computing device or the motion detection algorithm to determine whether the computing device is moving. At block 611, the method 600 may scan for a GNSS signal or a short range wireless signal. The GNSS signal and the short range wireless signal may also be individually or collectively referred to as a sensor signal or sensor data. If a GNSS signal is detected using the first sensor, at block 613, method 600 may scan for a GNSS location. Otherwise, if a short range wireless signal is detected using the second sensor, at block 612, method 600 may scan for a short range wireless location. A GNSS location and a short range wireless location may be individually or collectively referred to as a location. If neither a GNSS signal nor a short range wireless signal is detected, then the method 600 may continue to block 617. At block 615, the method 600 may determine whether a GNSS location is obtained. At block 614, the method 600 may determine whether a short range wireless location is obtained. At block 617, the method 600 may determine whether the modality is a first state such as a stationary state or a state associated with the computing device not moving.

In the current embodiment, if the modality is not the first state, at block 619, the method 600 may determine whether the modality is a second state such as a driving state or a state associated with the computing device moving at speeds associated with a car, a bus, a train, a plane, or the like. If the modality corresponds to the second state, at block 631, the method 600 may adjust the location scanning duty cycle based on the velocity of the computing device. The velocity of the computing device may be determined using the sensor data from the GNSS sensor or the WiFi sensor. A person of ordinary skill in the art will recognize various techniques for determining a velocity from sensor data of a GNSS sensor or a short range wireless sensor such as a WiFi sensor. In some instances, the faster the speed, the lower the duty cycle for scanning. At block 621, the method 600 may determine whether the modality corresponds to a third state such as a walking state or a state associated with the computing device moving at speeds associated with walking. If the modality corresponds to the third state, at block 629, the method 600 may adjust the location scanning duty cycle based on a velocity of the computing device. Further, a third sensor such as an accelerometer or a gyroscope may be used to determine a heading or direction that the computing device is moving or to perform functions of a pedometer.

In FIG. 6, at block 623, the method 600 may determine whether the modality corresponds to a fourth state such as an indoor state or a state associated with the computing device being indoors. In a typical indoor environment, a GNSS signal may be difficult to detect, whereas an in-building short range wireless signal such as a WiFi signal may be easier to detect. If the modality is the fourth state, at block 627, the method 600 may decrease a short range wireless scanning duty cycle. For example, in an in-building WiFi network, a lower duty cycle may still allow for the detection of multiple closely spaced access points (APs) while a user possessing a computing device walks around a building. If the modality is not the fourth state, at block 625, the method 600 may determine whether a location scanning timer has expired. At block 626, if the scanning time has not expired, then the method 600 may decrease the short range wireless scanning duty cycle or the GNSS scanning duty cycle if a location is not found within a certain time. Otherwise, if the scanning time has expired, then the method 600 may return to the interaction engine handler, at block 609.

In another embodiment, a multiple sensor integrated chip architecture for a computing device may be configured to include additional components or processors for audio, multimedia, or power management, for example.

In another embodiment, a multiple sensor integrated chip architecture for a computing device may include a multimode wireless communication integrated circuit or chipset.

In another embodiment, a threshold for waking up an application processor may use a receiver signal strength indicator (RSSI) or a desired confidence level. Other thresholds, such as confirming the contextual aware state or providing an acknowledgement of a point of interest, for example, may be based on a motion sensor, an audio level, or any other environmental sensory data. Power management may also be performed based on received threshold levels.

Figure 7:
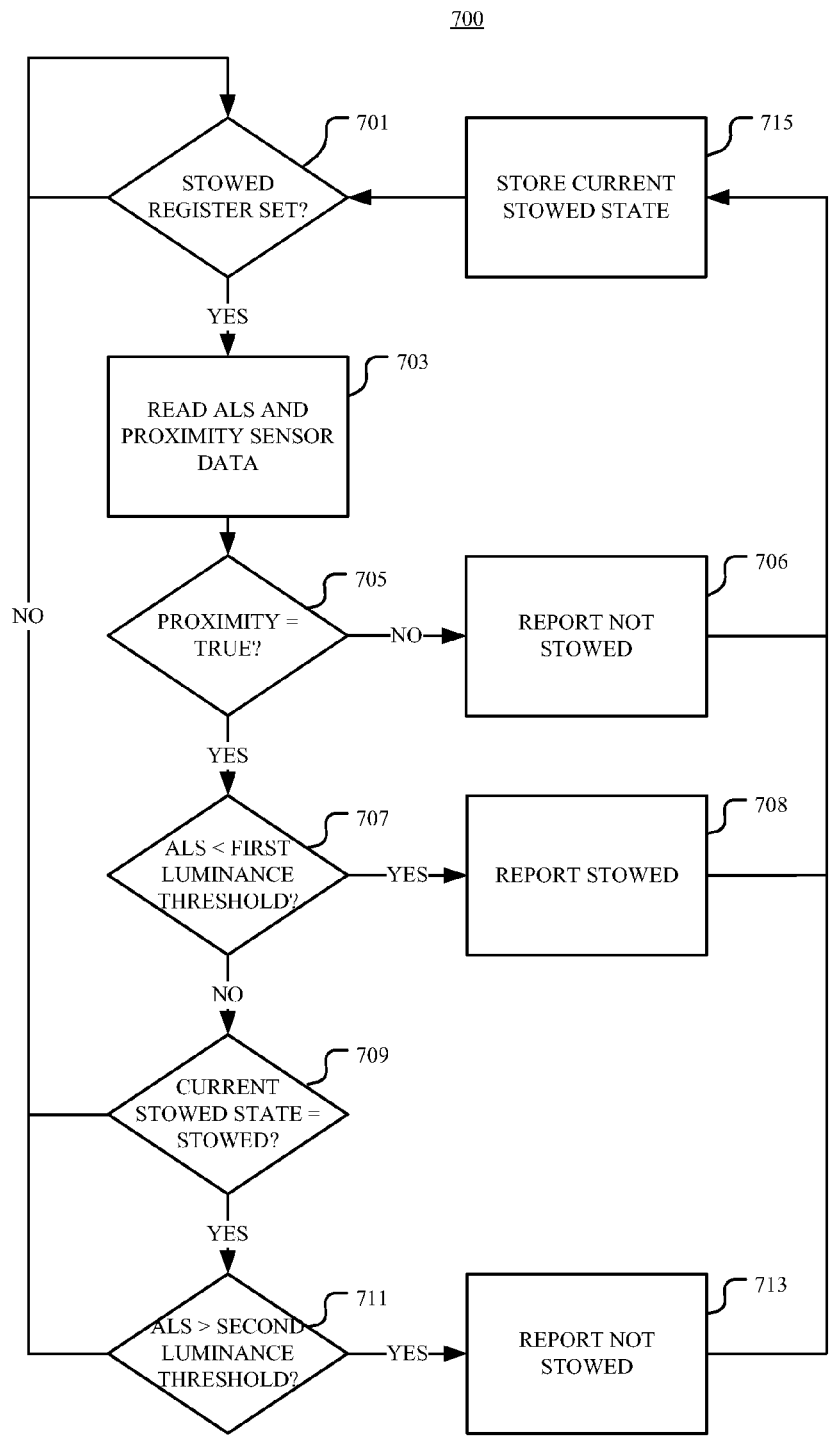
FIG. 7 is a flow chart of another embodiment of a method of determining a modality of a computing device having a multiple sensor integrated chip architecture with various aspects described herein.

FIG. 7 is a flow chart of another embodiment of a method 700 of determining a modality of a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor, a second processor, and a third processor. In one example, the method 700 may be performed by the first processor such as a sensor hub. Further, the first processor may perform the method 700 while the second processor such as an LPC or the third processor such as an application processor is in a low power mode. In FIG. 7, the method 700 may begin at, for instance, block 701 where it may determine whether a stowed register is set. The stowed register may be used to enable or disable a stowed algorithm, which is used to determine whether the computing device is stowed in a container such as a purse or a pocket. If the stowed register is not set, then method 700 may return to block 701. Otherwise, if the stowed register is set, at block 703, the method 700 may read ambient light sensor (ALS) data from an ALS sensor or proximity data from a proximity sensor.

In FIG. 7, at block 705, the method 700 may determine whether an object is in the proximity of the computing device. In one example, an object is in the proximity of the computing device if it is within a distance from the computing device of less than fifty millimeters (50 mm) or within a distance sufficient to determine whether the computing device is being stored in a container such as a purse or a wallet. In another example, an object is in the proximity of the computing device if it is within a distance from the computing device of less than thirty millimeters (30 mm). If an object is in the proximity of the computing device, at block 707, the method 700 may determine whether the ALS data corresponds to being less than a first luminance threshold such as twenty (20) lux or less than a luminance associated with the computing device being in a dimly lighted room. Otherwise, if an object is not in the proximity of the computing device, at block 706, the method 700 may report that the computing device is not stowed. If the ALS data corresponds to being at least the first luminance threshold, at block 709, the method 700 may determine whether the current stowed state is stowed. Otherwise, if the ALS data corresponds to being less than the first luminance threshold, at block 708, the method 700 may report that the computing device is stowed. If the current state is stowed, at block 711, the method 700 may determine whether the ALS data is greater than a second luminance threshold such as fifty (50) lux or greater than a luminance associated with the computing device being in a shadow of a lighted room. If the ALS data is greater than the second luminance threshold, at block 713, the method 700 may report that the computing device is not stowed. Otherwise, if the ALS data is less than or equal to the second luminance threshold, the method 700 may return to block 701.

Figure 8:
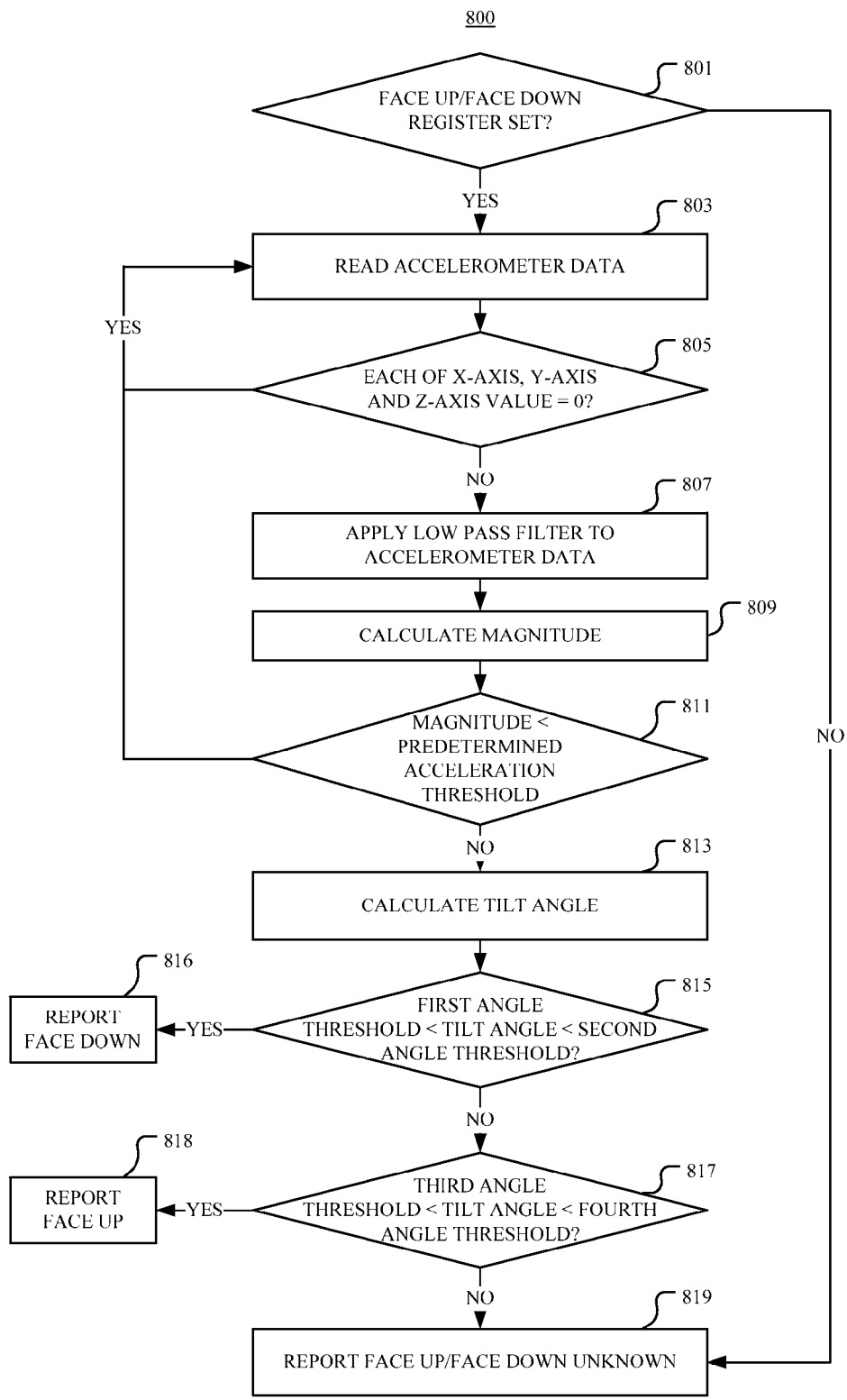
FIG. 8 is a flow chart of another embodiment of a method of determining a modality of a computing device having a multiple sensor integrated chip architecture with various aspects described herein.

FIG. 8 is a flow chart of another embodiment of a method 800 of determining a modality of a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor, a second processor, and a third processor. In one example, the method 800 may be performed by the first processor such as a sensor hub. Further, the first processor may perform the method 800 while the second processor such as an LPC or the third processor such as an application processor is in a low power mode. In FIG. 8, the method 800 may begin at, for instance, block 801 where it may determine whether a face up or face down register is set. The face up or face down register may be used to enable or disable a face up or face down algorithm, which is used to determine whether the computing device is face up or face down. If the face up or face down register is set, at block 803, the method 800 may read accelerometer data. Otherwise, if the face up or face down register is not set, at block 819, the method 800 may report that the face up or face down state of the computing device is unknown.

In FIG. 8, at block 805, the method 800 may determine whether each of an x-axis, a y-axis and a z-axis of the computing device is equal to zero, which may be associated with insufficient accelerometer data to perform the face up or face down algorithm or the first iteration through the algorithm. If each of the x-axis, the y-axis and the z-axis of the computing device is equal to zero, at block 807, the method 800 may apply a low pass filter or perform an averaging function on the accelerometer data. Otherwise, if each of the x-axis, the y-axis or the z-axis of the computing device is not equal to zero, the method 800 may return to block 803. At block 809, the method 800 may determine a magnitude of the filtered accelerometer data. At block 811, the method 800 may determine whether the magnitude of the filtered accelerometer data is less than a predetermined acceleration such as one meter per second squared ($1 \text{ m/s}^2$). If the filtered accelerometer data is at least the predetermined acceleration threshold, at block 813, the method 800 may determine a tilt angle of the computing device. A person of ordinary skill in the art will recognize various algorithms for determining a tilt angle of an object.

In the current embodiment, at block 815, the method 800 may determine whether the tilt angle along the z-axis of the computing device is in the range of a first angle threshold such as negative ninety degrees (−90°) and a second angle threshold such as negative seventy five degrees (−75°) or less than or equal to a third angle threshold such as negative fifteen degrees (−15°) relative to a surface perpendicular to a direction of gravity. In one example, the first angle threshold may be in the range from negative seventy degrees (−70°) to negative eighty nine degrees (−89°). In another example, the third angle threshold may be in the range of negative twenty degrees (−20°) to negative one degree (−1°).

In FIG. 8, if the tilt angle of the computing device is in the range of the first angle threshold and the second angle threshold or is less than or equal to the third angle threshold, at block 816, the method 800 may report that the computing device is face down. In one example, the first processor may report that the computing device is face down to the second processor or the third processor. In another example, the first processor may activate the second processor or a third processor prior to or contemporaneous with reporting that the computing device is face down. Otherwise, if the tilt angle is outside this range, at block 817, the method 800 may determine whether the computing device is between a fourth angle threshold such as seventy five degrees (75°) and a fifth angle threshold such as ninety degrees (90°) or less than or equal to a sixth angle threshold such as fifteen degrees (15°) relative to a surface perpendicular to the direction of gravity. In another example, the fourth angle may be in the range from seventy degrees (70°) to eighty nine degrees (89°). In another example, the sixth angle threshold may be in the range of twenty degrees (20°) to negative one degree (1°). If the tilt angle of the computing device is between the third angle and the fourth angle, at block 818, the method 800 may report that the computing device is face up. Otherwise, if the tilt angle is outside this range, at block 819, the method 800 may report that the face up or face down state of the computing device is unknown.

Figure 9:
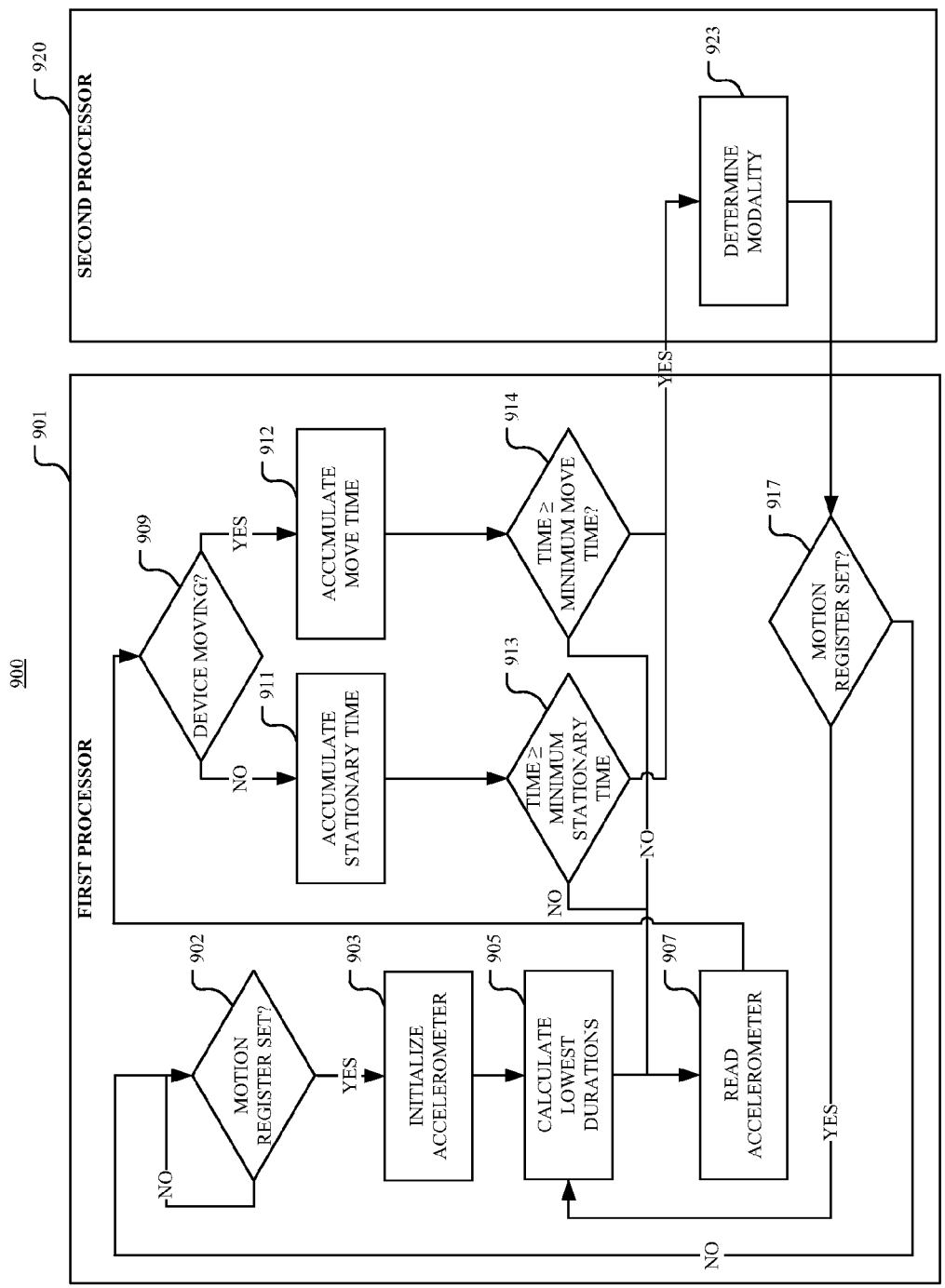
FIG. 9 is a flow chart of another embodiment of a method of determining a modality of a computing device having a multiple sensor integrated chip architecture with various aspects described herein.

FIG. 9 is a flow chart of another embodiment of a method 900 of determining a modality of a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor 901, a second processor 920, and a third processor. In one example, the method 900 may be performed by the first processor 901 such as a sensor hub and the second processor 920 such as an LPC. In another example, the method 900 may be performed by the first processor 901. In another example, the method 900 may be performed by the second processor 920. The first processor 901 or the second processor 920 may perform the method 900 while the third processor such as an application processor is in a low power mode. Further, while the first processor 901 is performing its portion of the method 900, the second processor 920 may be in a low power mode. Similarly, while the second processor 920 is performing its portion of the method 900, the first processor 901 may be in a low power mode.

In FIG. 9, the method 900 may begin at, for instance, block 902 where it may determine whether a motion register is set. The motion register may be used to enable or disable a motion detection algorithm, which is used to determine whether the computing device is in motion or motionless. If the motion register is set, at block 903, the method 900 may initialize an accelerometer sensor. Otherwise, if the motion register is not set, the method 900 may return to block 902. Multiple applications or features executed by the second processor or the third processor may request that the first processor provide an interrupt to notify it when motion is detected. Each of the applications or features of the second processor or the third processor may also request a duration of time by which the first processor must interrupt the second processor or the third processor.

In the current embodiment, at block 905, the method 900 may determine a minimum duration of time from a set of durations of time requested by applications or features of the second processor or the third processor prior to or contemporaneous with interrupting a processor. At block 907, the method 900 may read an accelerometer sensor to receive accelerometer data. At block 909, the method 900 may determine whether the computing device is moving or stationary using the accelerometer data. If the device is moving, at block 912, the method 900 may accumulate an amount of time that the computing device is moving. If the device is stationary, at block 911, the method 900 may accumulate a continuous amount of time that the computing device is stationary.

In FIG. 9, at block 913, the method 900 may determine whether the accumulated amount of time that the computing device is stationary is at least a minimum stationary time for determining whether the computing device is stationary. In one example, the minimum stationary time may be five (5) seconds or an amount of time needed to determine whether an object is stationary. In another example, the minimum stationary time may be in the range of one (1) second to ten (10)

seconds. If the accumulated amount of time that the computing device is stationary is at least the minimum stationary time, at block 923, the method 900 may have the first processor activate the second processor, so that the second processor may determine the modality of the computing device using the detection of the computing device as stationary. In one example, after the second processor determines the modality of the computing device, the second processor may activate the third processor to provide the modality. In another example, after the second processor determines the modality of the computing device, the second processor may report the modality to the first processor. The first processor may then report the modality to the third processor. The second processor may then enter a low power mode. If the amount of time that the computing device is stationary is less than the minimum stationary time, then the method 900 may return to block 907.

In the current embodiment, at block 914, the method 900 may determine whether the accumulated amount of time that the computing device is moving is at least the minimum move time for determining whether the computing device is moving. In one example, the minimum move time for determining whether the computing device is moving is ten (10) seconds. In another example, the minimum move time may be in the range of one (1) second to ten (10) seconds. If the amount of time that the computing device is moving is at least the minimum move time, at block 923, the method 900 may have the first processor activate the second processor, so that the second processor may determine the modality of the computing device using the detection of the movement of the computing device. If the accumulated amount of time that the computing device is moving is less than the minimum move time, then the method 900 may return to block 907. At block 917, the method 900 may determine whether the motion register is set. If the motion register is set, then the method 900 may return to block 905. If the motion register is not set, then the method 900 may return to block 902.

Figure 10:
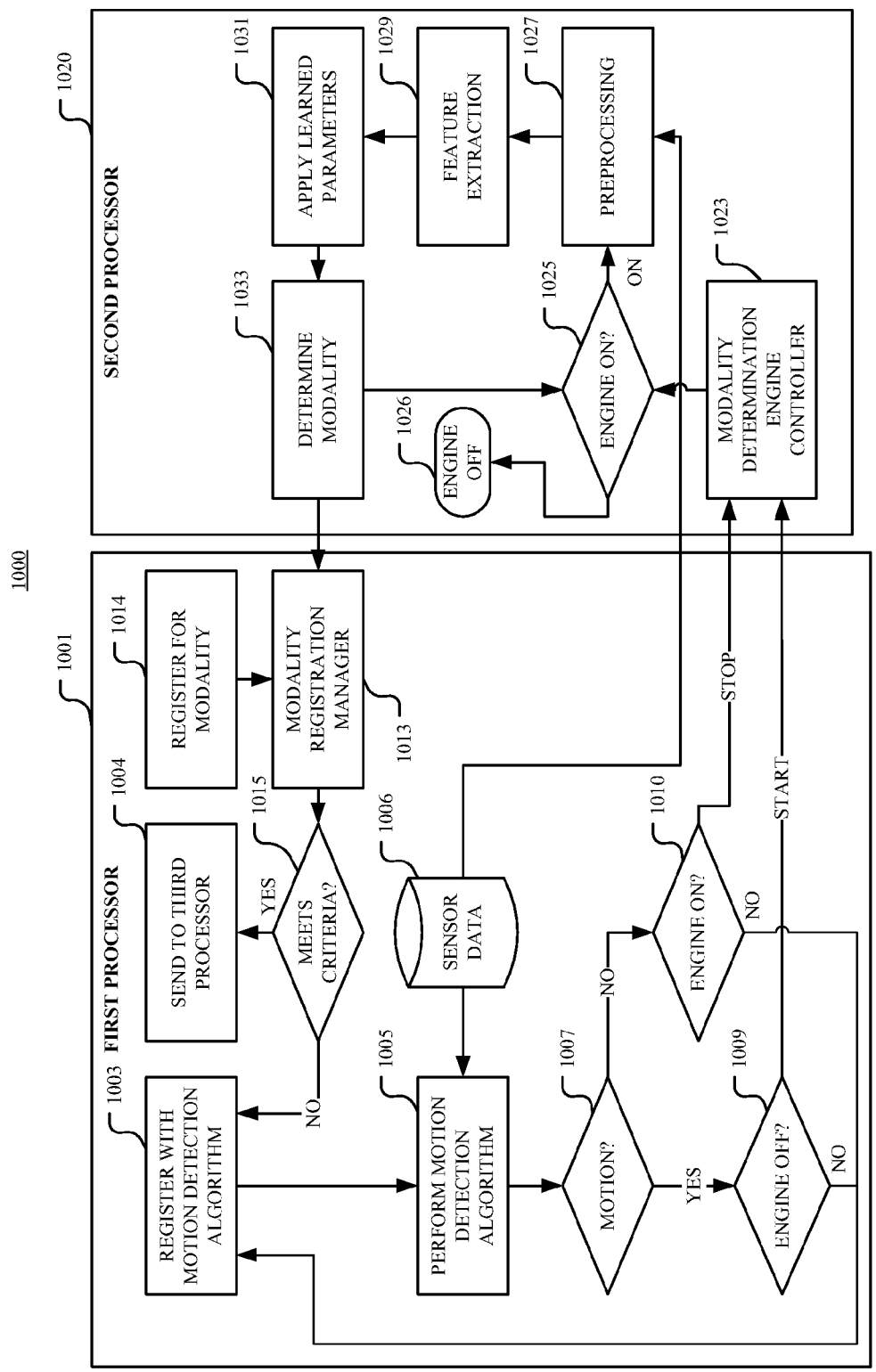
FIG. 10 is a flow chart of another embodiment of a method of determining a modality of a computing device having a multiple sensor integrated chip architecture with various aspects described herein.

FIG. 10 is a flow chart of another embodiment of a method 1000 of determining a modality of a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor 1001, a second processor 1020, and a third processor. In one example, the method 1000 may be performed by the first processor 1001 such as a sensor hub and the second processor 1020 such as an LPC. In another example, the method 1000 may be performed by the first processor 1001. In another example, the method 1000 may be performed by the second processor 1020. The first processor or the second processor may perform the method 1000 while the third processor is in a low power mode. Further, while the first processor is performing its portion of the method 1000, the second processor may be in a low power mode. In FIG. 10, the method 1000 may begin at, for instance, block 1003 where the second processor 1020, the third processor or another processor may register to receive a motion state of the computing device. In one example, applications or features of the third processor may register with the first processor 1001 to receive the motion state of the computing device. At block 1005, the method 1000 may perform a motion detection algorithm on sensor data 1006 such as from an accelerometer sensor. A person of ordinary skill in the art will recognize various algorithms for determining whether an object is stationary or moving.

In FIG. 10, at block 1007, the method 1000 may determine whether the computing device is stationary or moving. If the computing device is moving, at block 1009, the method 1000 may determine whether a modality determination engine is on. If the modality determination engine is on, then the first processor 1001 may send a request to the second processor 1020 to start the modality determination engine. In one example, the first processor 1001 may activate the second processor 1020 prior to or contemporaneous with requesting the start of the modality determination engine. If the computing device is stationary, at block 1010, the method 1000 may determine whether a modality determination engine is off. If the modality determination engine is on, then the first processor 1001 may send a request to the second processor 1020 to start the modality determination engine. At block 1023, the method 1000 may receive requests from the first processor 1001 to start or stop the modality determination engine controller. Further, the modality determination engine controller may start, stop, or control the modality determination engine.

In the current embodiment, at block 1025, the method 1000 may determine whether the modality determination engine controller is on or off. If the engine is off, at block 1026, the method 1000 may place the second processor 1020 into a low power mode or perform another function or task of the second processor 1020. If the engine is on, the method 1000 may commence the modality determination engine. The method 1000 may perform the modality determination engine by performing functions associated with a preprocessing block 1027, a feature extraction block 1029, an apply learned parameters module 1031, and a determine modality block 1033. The preprocessing block 1027 may be used to extract sensor data 1006 specific to a particular activity. The feature extraction block 1029 may be used to extract statistical and non-statistical information from the sensor data 1006. The apply learned parameters block 1031 may apply learned parameters to the extracted features of the sensor data 1006.

In FIG. 10, at block 1033, the method 1000 may determine the modality. Further, the method 1000 may provide the determined modality to the modality registration manager, as referenced at block 1013. Also, the method 1000 may return to check whether the modality determination engine is on or off, as referenced at block 1025. The confidence of the sensor data 1006 may be developed for greater accuracy based on the machine learning during the training stage. One or more levels of confidence may be used in the modality determination engine of the computing device. In one example, a first level of confidence may include the use of the sensory data associated with the accelerometer. In another example, a second level of confidence may include the use of sensory data associated with a short range wireless signal or a GNSS signal. In another example, a first, second or third level of confidence may include the use of sensory data associated with a microphone, an ambient light sensor (ALS), a proximity sensor, another sensor, or any combination thereof.

In this embodiment, at a modality registration manager block 1013, the method 1000 may receive the determined modality. In one example, the second processor 1020 may activate the first processor 1001 prior to or contemporaneous with sending the determined modality to the first processor 1001. At block 1015, the method 1000 may determine whether the determined modality meets a modality criteria provided by, for instance, an application or feature of the third processor. The third processor may register the modality criteria with the first processor 1001, as referenced at block 1014. If the determined modality meets or exceeds the modality criteria, at block 1004, the method 1000 may send a response to the third processor. In one example, the first processor 1001 may activate the third processor prior to or contemporaneous with sending the response that the determined modality meets or exceeds the modality criteria.

Figure 11:
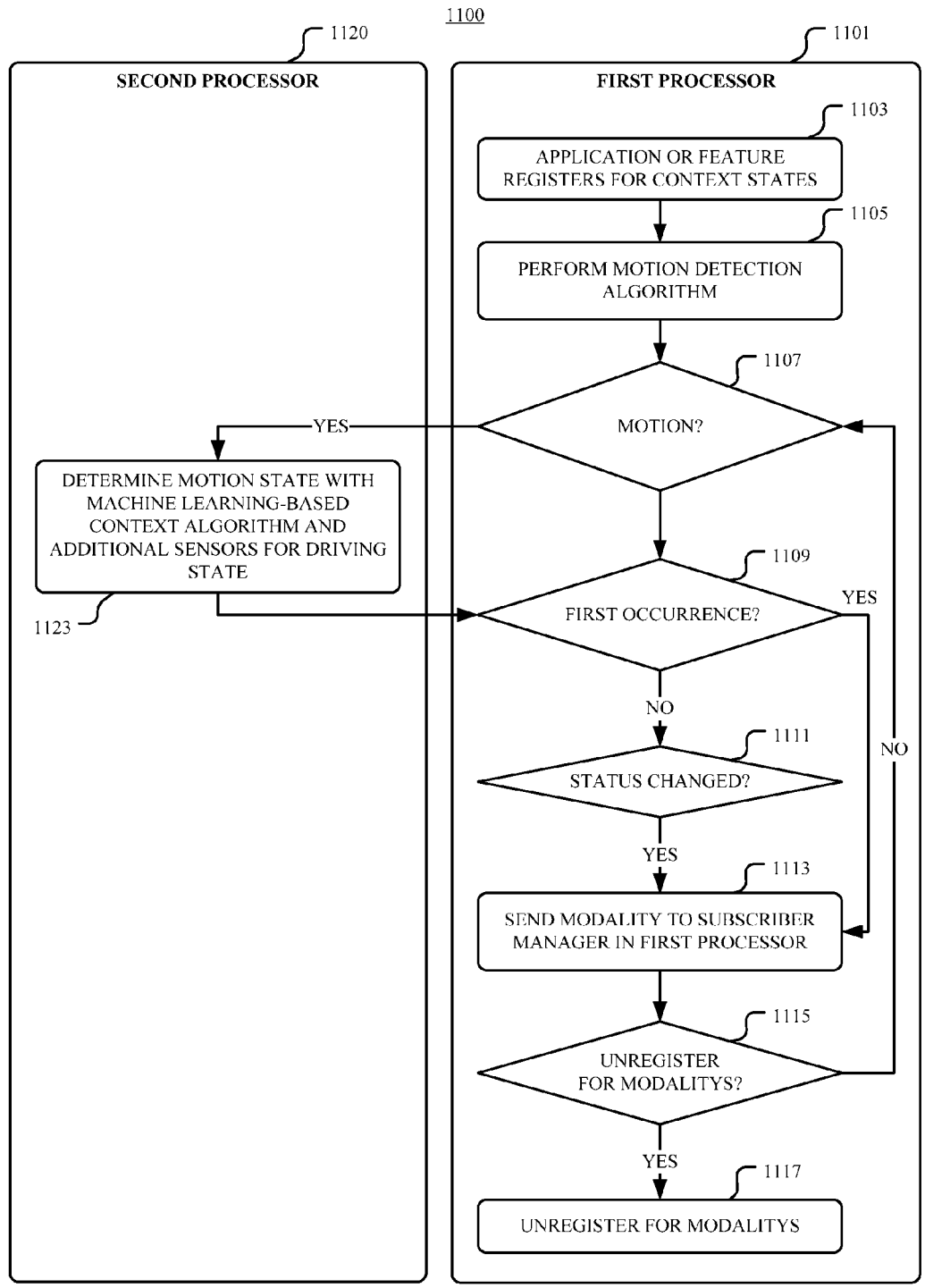
FIG. 11 is a flow chart of another embodiment of a method of determining a modality of a computing device having a multiple sensor integrated chip architecture with various aspects described herein.

FIG. 11 is a flow chart of one embodiment of a method 1100 of determining a modality of a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor 1101, a second processor 1120, and a third processor. In one example, the first processor 1101 may be a sensor hub, the second processor 1120 may be an LPC, and the third processor may be an application processor. In FIG. 11, the method 1100 may begin at, for instance, block 1103 where the first processor 1101 may receive, from an application or feature of the third processor, a request for the modality of the computing device. In response to the request for the modality of the computing device, at block 1105, the method 1100 may perform a motion detection algorithm using first sensor data from a first sensor. The first sensor may be at least one of an accelerometer, a magnetometer, a gyroscope, a barometer, and the like. In one example, the first sensor is an accelerometer. A person of ordinary skill in the art will recognize various algorithms for determining whether an object is stationary or moving.

In FIG. 11, at block 1107, the method 1100 may determine whether the computing device is stationary or moving. If the computing device is moving, at block 1123, the method 1100 may determine a motion state using a machine learning-based content algorithm, the first sensor data from the first sensor and second sensor data from the second sensor. The second sensor may be, for instance, a GNSS sensor or a short range wireless sensor. The first processor 1101 may need to activate the second processor 1120 prior to requesting the second processor to perform the machine learning-based content algorithm. If the computing device is stationary, at block 1109, the method 1100 may determine whether the current iteration is the first time for the first processor 1101 to determine the modality. At block 1111, the method 1100 may determine whether the modality is different from the previous modality. At block 1113, the method 1100 may send the modality of the computing device to the third processor using, for instance, a subscriber manager element of the first processor 1101. At block 1115, the method 1100 may determine whether there are any other requests for the modality of the computing device by an application or function of the application processor. At block 1117, the method 1100 may unregister the request for the modality of the computing device made by the application processor.

Figure 12:
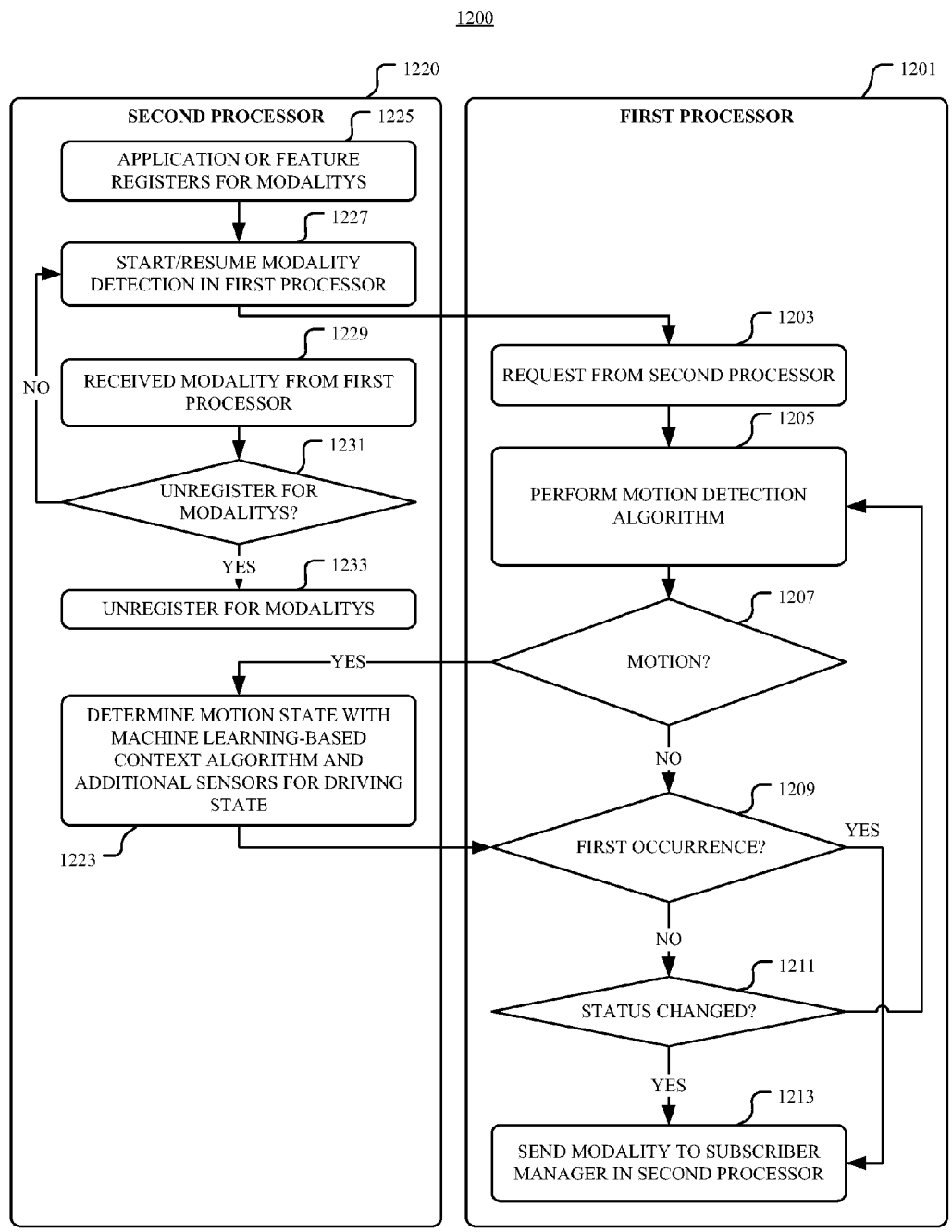
FIG. 12 is a flow chart of another embodiment of a method of determining a modality of a computing device having a multiple sensor integrated chip architecture with various aspects described herein.

FIG. 12 is a flow chart of another embodiment of a method of determining a modality of a computing device having a multiple sensor integrated chip architecture with various aspects described herein. The multiple sensor integrated chip architecture may be similar to the architecture described by FIG. 1B. Further, the multiple sensor integrated chip architecture may be configured to include a first processor 1201, a second processor 1220, and a third processor. In one example, the first processor 1201 may be a sensor hub, the second processor 1220 may be a low power core, and the third processor may be an application processor. In FIG. 12, the method 1200 may begin at, for instance, block 1225 where the second processor 1220 may receive, from an application or feature of the third processor, a request for the modality of the computing device. At block 1227, the method 1200 may start or resume the modality detection performed by the first processor 1201. In response to the request to start or resume the modality detection, at block 1203, the method 1200 may start or resume the modality detection performed by the first processor 1201. At block 1205, the method 1200 may perform a motion detection algorithm using first sensor data from a first sensor. The first sensor may be at least one of an accelerometer, a magnetometer, a gyroscope, a barometer, and the like. In one example, the first sensor is an accelerometer. A person of ordinary skill in the art will recognize various algorithms for determining whether an object is stationary or moving.

In FIG. 12, at block 1207, the method 1200 may determine whether the computing device is stationary or moving. If the computing device is moving, at block 1223, the method 1200 may determine a motion state using a machine learning-based content algorithm, the first sensor data from the first sensor and second sensor data from the second sensor. The second sensor may be, for instance, a GNSS sensor or a short range wireless sensor. At block 1209, the method 1200 may determine whether the current iteration is the first time to determine the modality. At block 1211, the method 1200 may determine whether the modality is different from the previous modality. At block 1213, the method 1200 may send the modality of the computing device to, for instance, a subscriber manager element of the second processor 1220. At block 1229, the method 1200 may receive the modality of the computing device from the first processor 1201. At block 1231, the method 1200 may determine whether there are any other requests for the modality of the computing device by an application or function of the application processor. At block 1233, the method 1200 may unregister the request for the modality of the computing device made by the application processor.

Figure 13:
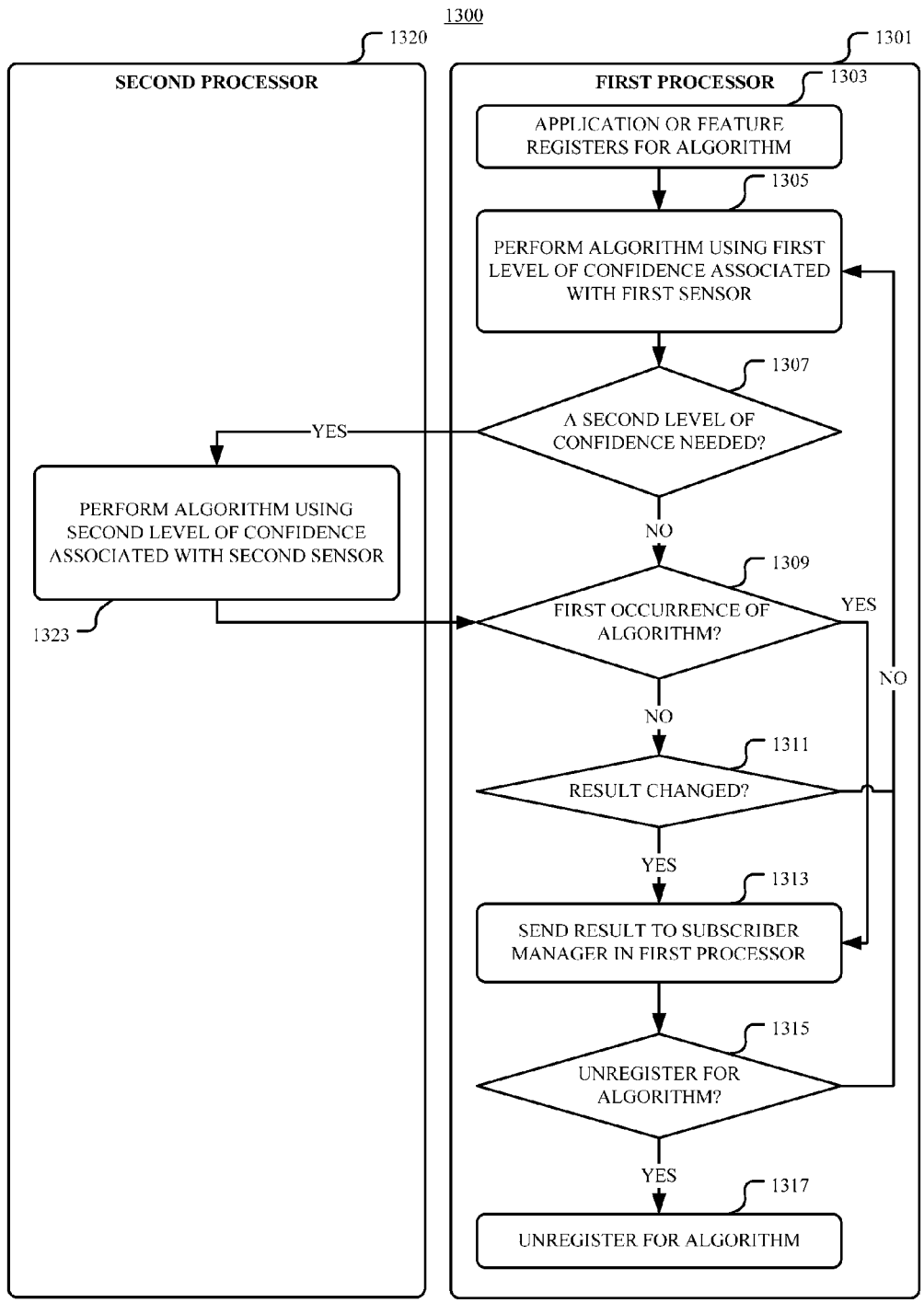
FIG. 13 is a flow chart of one embodiment of a method of performing an algorithm in a computing device having a multiple sensor integrated chip architecture with various aspects described herein.

FIG. 13 is a flow chart of one embodiment of a method 1300 of performing an algorithm in a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor 1301, a second processor 1320, and a third processor. In one example, the first processor 1301 may be a sensor hub, the second processor 1320 may be an LPC, and the third processor may be an application processor. In FIG. 13, the method 1300 may begin at, for instance, block 1303 where the first processor 1301 may receive, from an application or feature of the third processor, a request to perform an algorithm. In response to the request to perform the algorithm, at block 1305, the method 1300 may perform the algorithm using a first level of confidence associated with first sensor data from a first sensor. The first sensor may be at least one of an accelerometer, a magnetometer, a gyroscope, a barometer, and the like. In one example, the first sensor is an accelerometer.

In FIG. 13, at block 1307, the method 1300 may determine whether a second level of confidence is needed. In one example, the algorithm may detect whether the computing device is stationary or in motion using the first level of confidence and may detect the modality of the computing device using the second level of confidence. The second level of confidence may be associated with second sensor data from a second sensor. The second sensor may be a sensor associated with a location of the computing device such as a GNSS sensor or a short range wireless sensor, a sensor associated with an environment surrounding the computing device such as a microphone sensor, or a sensor associated with a communication performed proximate to the computing device such as a microphone sensor. If the second level of confidence is required, at block 1323, the method 1300 may perform the algorithm using the second level of confidence associated with the second sensor data from the second sensor. The first processor 1301 may send, to the second processor 1320, the first sensor data from the first sensor or other information associated with the first level of confidence. Also, the first processor 1301 may need to activate the second processor 1320.

In the current embodiment, at block 1309, the method 1300 may determine whether the current iteration is the first time to perform the algorithm. At block 1311, the method 1300 may determine whether a result of the algorithm has changed. If the result is different, at block 1313, the method 1300 may send the result to the third processor using, for instance, a subscriber manager element of the first processor 1301. Otherwise, if the result is the same, the method 1300 may return to block 1305. At block 1315, the method 1300 may determine whether there are any other requests to perform the algorithm by an application or function of the second processor or the third processor. At block 1317, the method 1300 may unregister the request to perform the algorithm made by the specific application or feature of the second processor or the third processor.

Figure 14:
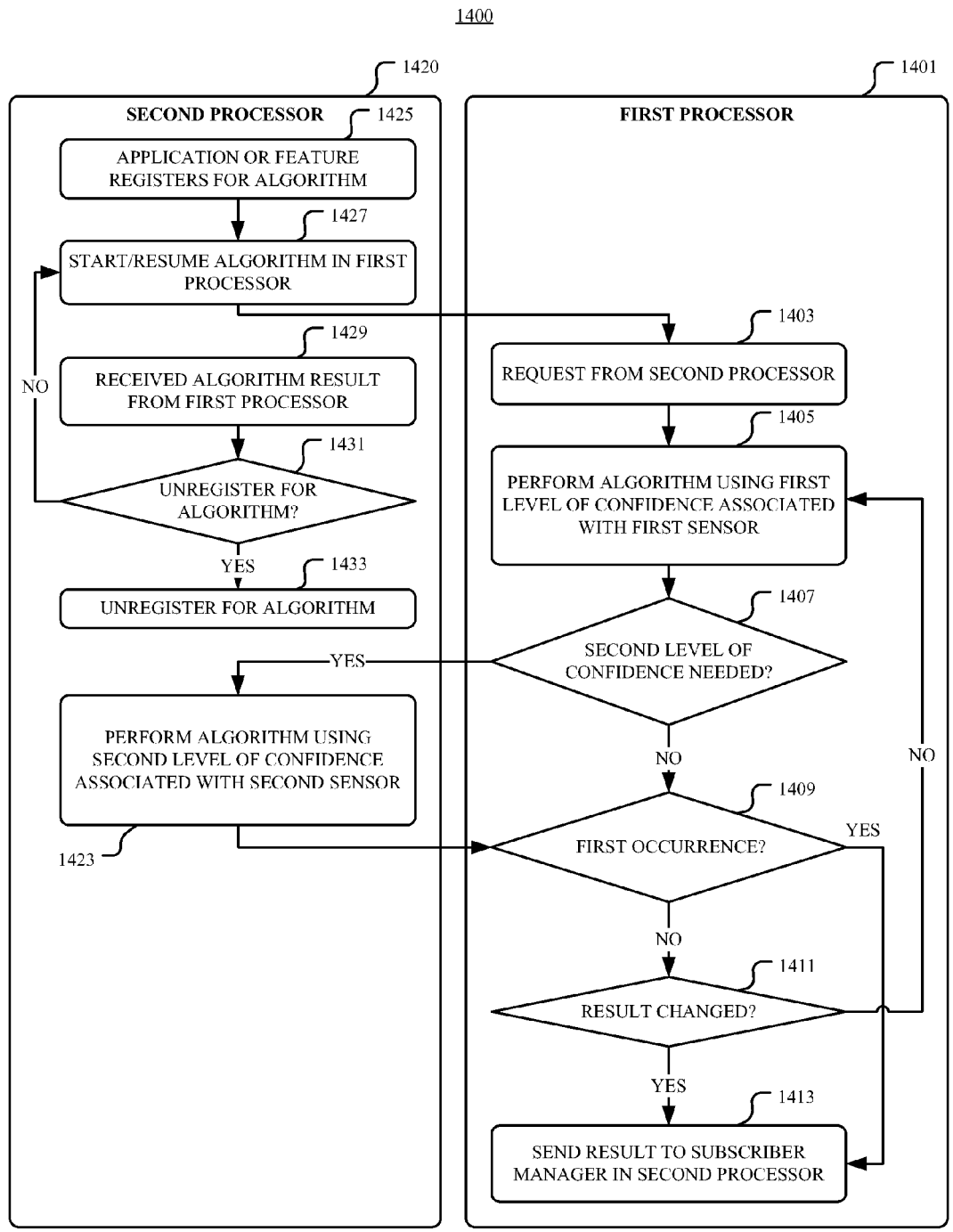
FIG. 14 is a flow chart of another embodiment of a method of performing an algorithm in a computing device having a multiple sensor integrated chip architecture with various aspects described herein.

FIG. 14 is a flow chart of one embodiment of a method 1400 of performing an algorithm in a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor 1401, a second processor 1420, and a third processor. In one example, the first processor 1401 may be a sensor hub, the second processor 1420 may be a low power core, and the third processor may be an application processor. In FIG. 14, the method 1400 may begin at, for instance, block 1425 where the second processor 1420 may receive, from an application or feature of the third processor, a request to perform an algorithm. At block 1427, the method 1400 may start or resume the algorithm performed by the first processor 1401. In response to the request to start or resume the algorithm, at block 1403, the method 1400 may start or resume the algorithm performed by the first processor 1401. At block 1405, the method 1400 may perform the algorithm using a first level of confidence associated with first sensor data from a first sensor. The first sensor may be at least one of an accelerometer, a magnetometer, a gyroscope, a barometer, and the like. In one example, the first sensor is an accelerometer.

In FIG. 14, at block 1407, the method 1400 may determine whether a result of the algorithm requires a second level of confidence associated with second sensor data from a second sensor. The second sensor may be a sensor associated with a location of the computing device such as a GNSS sensor or a short range wireless sensor, a sensor associated with an environment surrounding the computing device such as a microphone sensor, or a sensor associated with a communication performed proximate to the computing device such as a microphone sensor. If the second level of confidence is required, at block 1423, the method 1400 may perform the algorithm using the second level of confidence associated with the second sensor data from the second sensor. The first processor 1401 may send, to the second processor 1420, the first sensor data from the first sensor or other information associated with the first level of confidence. Also, the first processor 1401 may need to activate the second processor 1420.

In the current embodiment, at block 1409, the method 1400 may determine whether the current iteration is the first time to perform the algorithm. At block 1411, the method 1400 may determine whether a result of the algorithm has changed. If the result is different, at block 1413, the method 1400 may send the result to a subscriber manager element of the second processor 1420. Otherwise, if the result is the same, the method 1400 may return to block 1405. At block 1429, the method 1400 may receive the result of the algorithm from the first processor 1401. At block 1431, the method 1400 may determine whether there are any other requests to perform the algorithm by an application or function of the third processor. At block 1433, the method 1400 may unregister the request to perform the algorithm made by a specific application or feature of the third processor.

Figure 15:
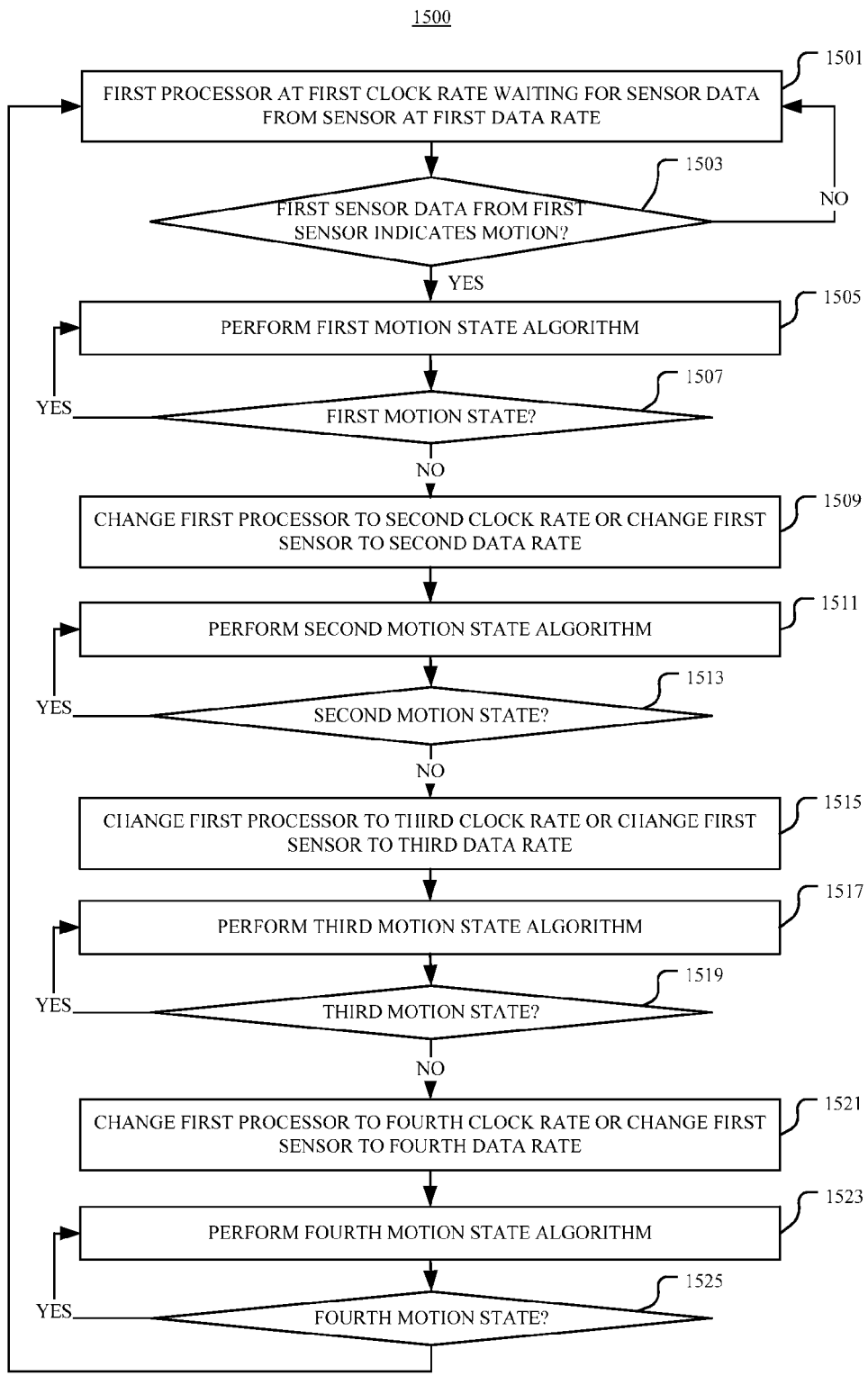
FIG. 15 is a flow chart of one embodiment of a method of low-power management of a multiple sensor integrated chip architecture of a computing device with various aspects described herein.

FIG. 15 is a flow chart of one embodiment of a method 1500 of low-power management of a multiple sensor integrated chip architecture of a computing device with various aspects described herein. The multiple sensor integrated chip architecture may be similar to the architecture described by FIG. 1B or FIG. 2. Further, the multiple sensor integrated chip architecture may be configured to include a first processor, a second processor, and a third processor. In one example, the method 1500 may be performed by the first processor such as a sensor hub. Further, the first processor may perform the method 1500 while the second processor such as an LPC or the third processor such as an application processor is in a low power mode.

In FIG. 15, the method 1500 may begin at, for instance, block 1501 where the first processor may be operating at a first clock rate while waiting for sensor data from a sensor operating at a first data rate. While waiting for the sensor data from the sensor, the first processor operating at the first clock rate may operate in a low power state such as a standby mode or a sleep mode. In one example, the sensor may be an accelerometer. The sensor data may represent one or more readings of the sensor. At block 1503, the method 1500 may determine whether the sensor data from the sensor indicates motion of the computing device. In one example, the sensor may be used to activate the first processor when the sensor senses motion of the computing device. In another example, the sensor data from the sensor may be used by the first processor to determine motion of the computing device.

In the current embodiment, at block 1505, the method 1500 may perform a first motion state algorithm using the sensor data from the sensor. The first motion state algorithm may be used to determine whether the computing device is in a first motion state. In one example, the first motion state may be associated with the computing device being stationary. A person of ordinary skill in the art will recognize various algorithms for determining various motion states of an object. If the computing device is in the first motion state, then the method 1500 may return to block 1505. Otherwise, if the computing device is not in the first motion state, at block 1509, the method 1500 may change the first processor to a second clock rate or change the sensor to a second data rate. In one example, the second clock rate may be fifty percent (50%) greater than the first clock rate or a sufficient clock rate to meet the processing needs of an algorithm or function to be performed next by the first processor such as another motion state algorithm. In another example, the second clock rate may be in the range of zero percent (0%) to one hundred percent (100%) greater than the first clock rate. In one example, the second data rate may be fifty percent (50%) greater than the first data rate or a data rate sufficient to meet the data needs of an algorithm or function to be performed next by the first processor such as another motion state algorithm. In another example, the second data rate may be in the range of zero percent (0%) to one hundred percent (100%) greater than the first data rate.

In FIG. 15, at block 1511, the method 1500 may perform a second motion state algorithm using the sensor data from the sensor. The second motion state algorithm may be used to determine whether the computing device is in a second motion state. In one example, the second motion state may be associated with the computing device moving at a walking speed. At block 1513, the method 1500 may determine whether the computing device is in the second motion state. If the computing device is in the second motion state, then the method 1500 may return to block 1511. Otherwise, if the computing device is not in the second motion state, at block 1515, the method 1500 may change the clock rate of the first processor to a third clock rate or change the data rate of the sensor to a third data rate. In one example, the third clock rate may be fifty percent (50%) greater than the first or second clock rates or a sufficient clock rate to meet the processing needs of an algorithm or function to be performed next by the first processor such as another motion state algorithm. In another example, the third clock rate may be in the range of zero percent (0%) to one hundred percent (100%) greater than the first or second clock rates. In one example, the third data rate may be fifty percent (50%) greater than the first or second data rates or a data rate sufficient to meet the data needs of an algorithm or function to be performed next by the first processor such as another motion state algorithm. In another example, the third data rate may be in the range of zero percent (0%) to one hundred percent (100%) greater than the first or second data rates.

In the current embodiment, at block 1517, the method 1500 may perform a third motion state algorithm using the sensor data from the sensor. The third motion state algorithm may be used to determine whether the computing device is in a third motion state. In one example, the third motion state may be associated with the computing device moving at a running speed. At block 1519, the method 1500 may determine whether the computing device is in the third motion state. If the computing device is in the third motion state, then the method 1500 may return to block 1517. Otherwise, if the computing device is not in the third motion state, at block 1521, the method 1500 may change the first processor to a fourth clock rate or change the sensor to a fourth data rate. In one example, the fourth clock rate may be fifty percent (50%) greater than the first, second or third clock rates or a sufficient clock rate to meet the processing needs of an algorithm or function to be performed next by the first processor such as another motion state algorithm. In another example, the fourth clock rate may be in the range of zero percent (0%) to one hundred percent (100%) greater than the first, second or third clock rates. In one example, the fourth data rate may be fifty percent (50%) greater than the first, second or third data rates or a data rate sufficient to meet the data needs of an algorithm or function to be performed next by the first processor such as another motion state algorithm. In another example, the fourth data rate may be in the range of zero percent (0%) to one hundred percent (100%) greater than the first, second or third data rates.

In FIG. 15, at block 1523, the method 1500 may perform a fourth motion state algorithm using the sensor data from the sensor. The fourth motion state algorithm may be used to determine whether the computing device is in a fourth motion state. In one example, the fourth motion state may be associated with the computing device moving at a vehicle speed. At block 1525, the method 1500 may determine whether the computing device is in the fourth motion state. If the computing device is in the fourth motion state, then the method 1500 may return to block 1523. Otherwise, if the computing device is not in the fourth motion state, then the method 1500 may return to block 1501.

Figure 16:
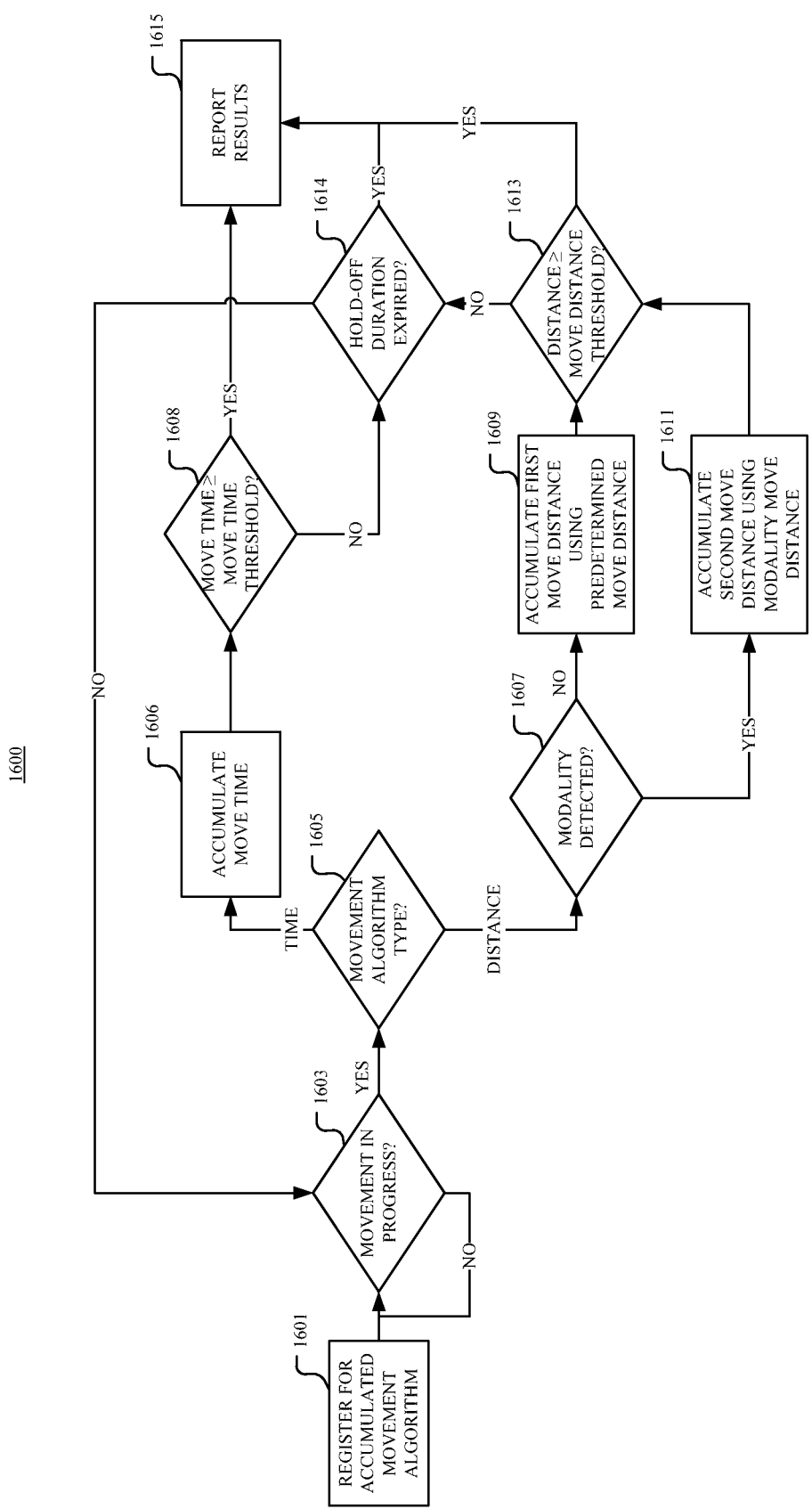
FIG. 16 is a flow chart of one embodiment of a method of determining an accumulated movement of a computing device having a multiple sensor integrated chip architecture with various aspects described herein.

FIG. 16 is a flow chart of one embodiment of a method 1600 of determining an accumulated movement of a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor, a second processor, and a third processor. In one example, the method 1600 may be performed by the first processor such as a sensor hub. Further, the first processor may perform the method 1600 while the second processor such as an LPC or the third processor such as an application processor is in a low power mode.

In FIG. 16, the method 1600 may begin at, for instance, block 1601 where the first processor may receive, from an application or feature of the second or third processor, a request to perform an accumulated movement algorithm. At block 1603, the method 1600 may determine whether the computing device is stationary or in motion. If the computing device is stationary, then the method 1600 may wait until the computing device is in motion. Otherwise, if the computing device is in motion, at block 1605, the method 1600 may determine which type of movement algorithm to use. In one example, the type of movement algorithm may be a movement algorithm based on time or a movement algorithm based on distance.

In the current embodiment, if the type of movement algorithm is based on time, at block 1606, the method 1600 may accumulate a move time. At block 1608, the method 1600 may determine whether a move time is at least a move time threshold. The move time threshold may correspond to a certain distance based on an assumed rate. In one example, the move time threshold may be set to ten (10) seconds corresponding to the computing device moving thirty meters at an assumed rate of three meters per second (3 m/s). In another example, the move time threshold may be set to twenty (20) seconds corresponding to the computing device moving one hundred and twenty (120) meters at an assumed rate of three meters per second (6 m/s). If the move time is at least the move time threshold, at block 1615, the method 1600 may report the move time or that the move time of the computing device is at least the move time threshold. In one example, the first processor may report that the move time of the computing device is at least the move time threshold to the second processor or the third processor. In another example, the first processor may activate the second processor or a third processor prior to or contemporaneous with reporting that the move time of the computing device is at least the move time threshold. If the move time is less than the move time threshold, at block 1614, the method 1600 may determine whether a hold-off duration has expired. The hold-off duration may be used to trigger a response to another processor after the expiration of the hold-off duration. In one example, the hold-off duration may be twenty (20) seconds. If the hold-off duration has expired, at block 1615, the method 1600 may report that the hold-off duration has expired. Otherwise, if the hold-off duration has not expired, then the method 1600 may return to block 1603.

In FIG. 16, if the type of movement is based on distance, at block 1607, the method 1600 may determine whether a modality is detected. In one example, the modality may include being stationary, micro-motion, walking, jogging, running, driving, in vehicle, out of vehicle or the like. The modality determination algorithm may be performed in parallel in the first processor or the second processor. If the modality is not detected, at block 1609, the method 1600 may accumulate a first move distance. In one example, the first move distance may be determined by accumulating a first predetermined distance. The first predetermined move distance may be a product of a duty cycle of the accumulated movement algorithm and a predetermined movement velocity such as a vehicular velocity. In one example, the duty cycle of the movement algorithm may be one Hertz (1 Hz) and the predetermined movement velocity may be six meters per second (6 m/s). Thus, the first predetermined move distance is six meters (6 m). At block 1613, the method 1600 may determine whether the first move distance is at least a move distance threshold. If the first move distance is at least the move distance threshold, at block 1615, the method 1600 may report the first move distance or that the first move distance is at least the move distance threshold. Otherwise, if the first move distance is less than the move distance threshold, at block 1614, the method 1600 may determine whether a hold-off duration has expired.

In this embodiment, if the modality is detected, at block 1611, the method 1600 may accumulate a second move distance by adding a modality move distance to the first move distance. The modality move distance may be determined using a velocity of the detected modality. Further, the modality move distance may be predetermined for each modality. The modality move distance may be a product of a duty cycle of the accumulated movement algorithm and the velocity of the detected modality. In one example, a duty cycle of the movement algorithm may be one Hertz (1 Hz), the detected modality may be walking, and the velocity for walking may be one and one-half meters per second (1.5 m/s). Thus, the modality move distance is one and one-half meters (1.5 m). In another example, a duty cycle of the movement algorithm may be one Hertz (1 Hz), the detected modality may be jogging, and the velocity for jogging may be three meters per second (3 m/s). Thus, the modality move distance is three meters (3 m). In another example, a duty cycle of the movement algorithm may be one Hertz (1 Hz), the detected modality may be running, and the velocity for running may be four meters per second (4 m/s). Thus, the modality move distance is four meters (4 m). In another example, a duty cycle of the movement algorithm may be one Hertz (1 Hz), the detected modality may be driving, and the velocity for the driving modality may be six meters per second (6 m/s). Thus, the modality move distance is six meters (6 m).

In FIG. 16, at block 1613, the method 1600 may determine whether the second move distance is at least a move distance threshold. If the second move distance is at least the move distance threshold, at block 1615, the method 1600 may report the second move distance or that the second move distance is at least the move distance threshold. Otherwise, if the second move distance is less than the move distance threshold, at block 1614, the method 1600 may determine whether a hold-off duration has expired.

Figure 17:
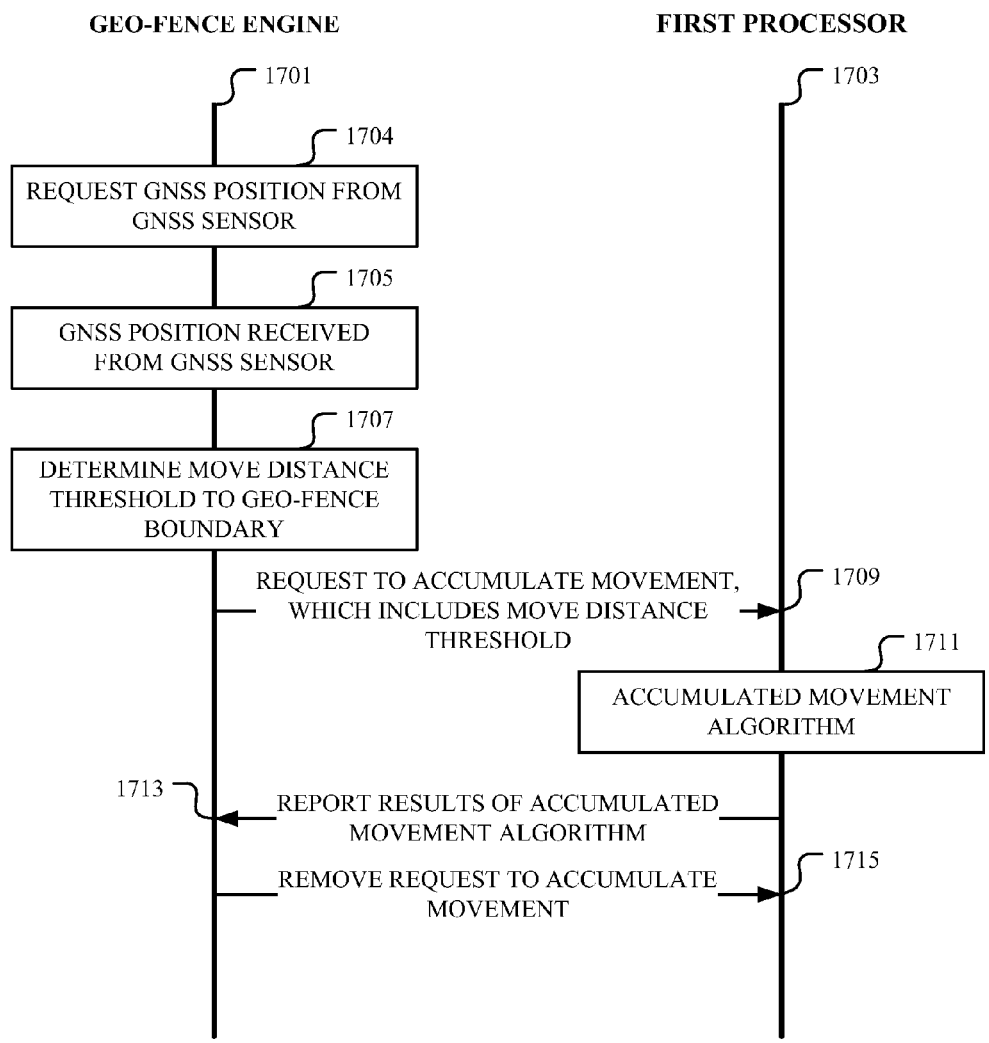
FIG. 17 is a ladder diagram showing example signals that may be exchanged between a geo-fence engine and an accumulated movement algorithm operating in a multiple sensor integrated chip architecture of a computing device with various aspects described herein.

FIG. 17 is a ladder diagram 1700 showing example signals that may be exchanged between a geo-fence engine and an accumulated movement algorithm operating in a multiple sensor integrated chip architecture of a computing device with various aspects described herein. In one definition, a geo-fence may be a virtual perimeter for a real-world geographic area. In another definition, a geo-fence may be a dynamically generated virtual boundary around a location. In another definition, a geo-fence may be a predetermined set of boundaries. The multiple sensor integrated chip architecture may be similar to the architecture described by FIG. 1B or FIG. 2. Further, the multiple sensor integrated chip architecture may be configured to include a first processor, a second processor, and a third processor. The ladder diagram 1700 may include a geo-fence engine 1701 and a first processor 1703. The second processor such as an LPC or the third processor such as an application processor may include the geo-fence engine. The geo-fence engine 1701 may request a GNSS position from a GNSS sensor, as referenced at block 1704.

In FIG. 17, in response to the request, the geo-fence engine 1701 may receive a GNSS position from the GNSS sensor, as referenced at block 1705. In response to receiving the GNSS position, the geo-fence engine 1701 may determine a move distance threshold to a geo-fence boundary around the GNSS position. Further, the geo-fence engine 1701 may send to the first processor 1703 a signal to request to accumulate movement, which may also include a move distance threshold, such as described in FIG. 16, as described by reference number 1709. The geo-fence engine 1701 may also send to the first processor 1703 a hold-off duration, such as described in FIG. 16. In response to the request to accumulate movement, the first processor 1703 may perform an accumulated movement algorithm 1711, such as described in FIG. 16. After the execution of the accumulated movement algorithm, the first processor 1703 may send a signal to the geo-fence engine reporting the results of the accumulated movement algorithm, as described by reference number 1713. In one example, in response to the accumulated movement being at least the move distance threshold, the first processor 1703 may send a signal to the geo-fence engine 1701 reporting the accumulated movement or that the accumulated movement is at least the move distance threshold. In another example, in response to the hold-off duration expiring, the first processor 1703 may send a signal to the geo-fence engine 1701 reporting that the hold-off duration expired. In response to report results of the accumulated movement algorithm, the geo-fence engine 1701 may send a signal to the first processor to remove the request to accumulate movement, as described by reference number 1715. In response to the remove request to accumulate movement, the first processor 1703 may remove the request to accumulate movement.

Figure 18:
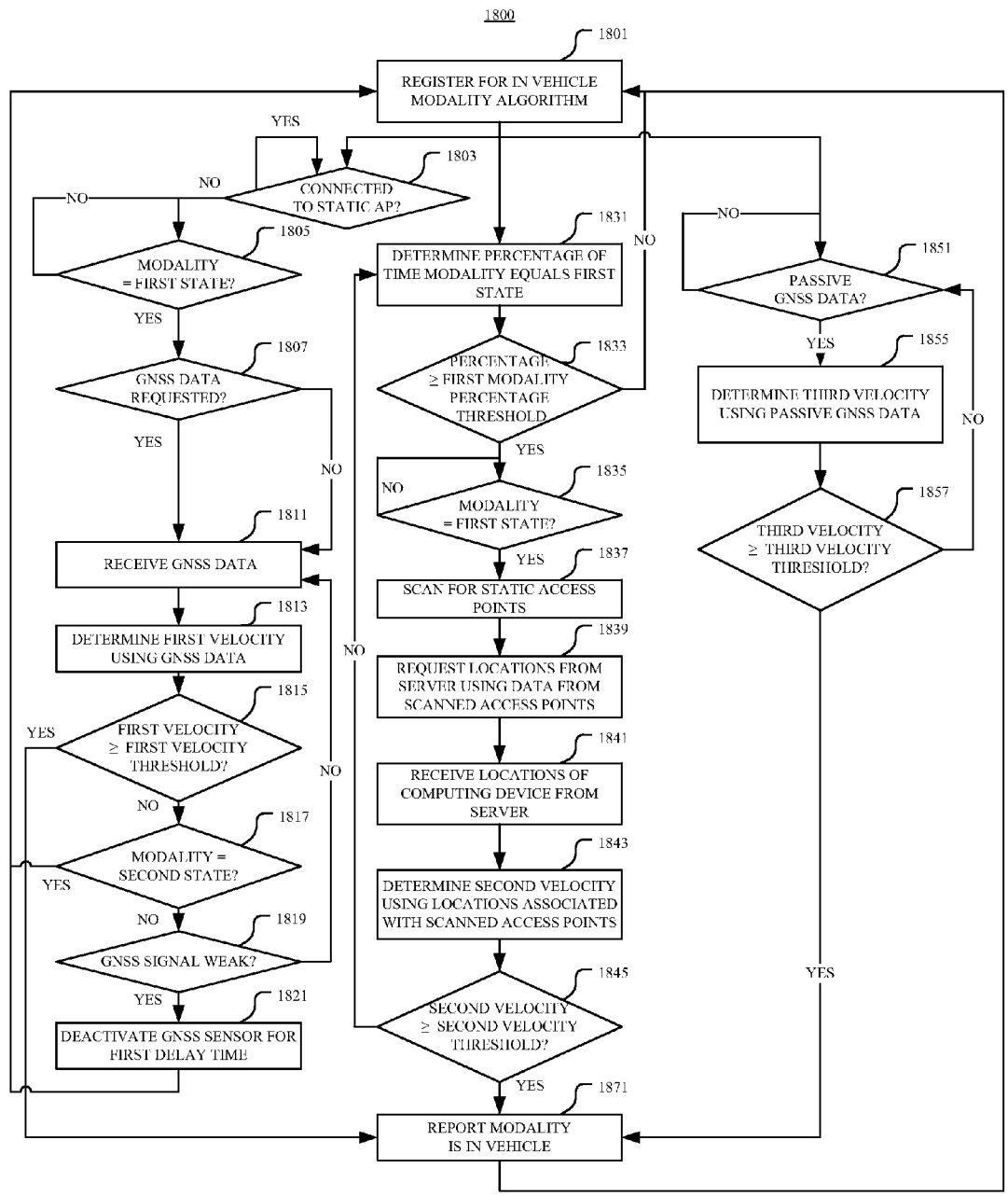
FIG. 18 is a flow chart of one embodiment of a method of determining a modality of in vehicle for a computing device having a multiple sensor integrated chip architecture with various aspects described herein.

FIG. 18 is a flow chart of one embodiment of a method 1800 of determining a modality of in vehicle for a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor, a second processor, and a third processor. In one example, the method 1800 may be performed by the third processor such as an application processor. In another example, the method 1800 may be performed by the second processor such as an LPC. In another example, a portion of the method 1800 may be performed by the third processor while another portion of the method 1800 is performed by the second processor. In FIG. 18, the method 1800 may begin at, for instance, block 1801 where it may receive, from an application or feature of the second processor or the third processor, a request to perform an in vehicle modality algorithm. At block 1803, the method 1800 may determine whether the computing device is connected to a static access point (AP). In one definition, a static AP is a device that allows a wireless device to couple to a wired network using short range wireless communication such as WiFi or related standards and is fixed to a geographic location.

In FIG. 18, if the computing device is not connected to the static AP, at block 1805, the method 1800 may determine whether a modality is equal to a first predetermined state. In one example, the first predetermined state may be in vehicle or a state associated with the computing device moving at a vehicle velocity. It is important to recognize that the modality may be determined independent of the method 1800 and may change contemporaneous with the operation of the method 1800. In one example, the modality may be determined by, for instance, a modality determination algorithm performed in the first processor or the second processor. If the computing device is connected to the static AP, then the method 1800 may return to block 1803. If the modality is equal to the first predetermined state, at block 1807, the method 1800 may determine whether GNSS data has been requested from a GNSS sensor within a first GNSS request time. In one example, the first GNSS request time may be such one hundred and twenty (120) seconds. In another example, the first GNSS request time may be in the range of thirty (30) seconds to two hundred and forty (240) seconds. Otherwise, if the modality is not equal to the first predetermined state, then the method 1800 may wait for the modality to equal the first state.

In the current embodiment, if the GNSS data has been requested from the GNSS sensor, at block 1811, the method 1800 may receive GNSS data from the GNSS sensor. The GNSS data may represent one or more readings of the GNSS sensor. At block 1813, the method 1800 may determine a first velocity using the GNSS data. In one example, the first velocity may be determined from GNSS data associated with three (3) consecutive readings of the GNSS sensor. In another example, the first velocity may be determined from GNSS data associated with three (3) readings of the GNSS sensor within a certain period of time such as ten (10) seconds.

In FIG. 18, at block 1815, the method 1800 may determine whether the first velocity is at least a first velocity threshold. In one example, the first velocity threshold may be six meters per second (6 m/s) or faster than a typical person may run. In another example, the first velocity threshold may be in the range of five meters per second (5 m/s) to ten meters per second (10 m/s). If the first velocity is at least the first velocity threshold, at block 1871, the method 1800 may report to the requesting application or feature of the second processor or the third processor that the modality of the computing device is in vehicle. In one example, the second processor may report that the modality is in vehicle to an application or a feature of the third processor. In another example, the second processor may activate the third processor prior to or contemporaneous with reporting that the modality is in vehicle. In another example, the third processor may report that the modality is in vehicle to an application or a feature of the third processor.

In the current embodiment, if the first velocity is less than the first velocity threshold, at block 1817, the method 1800 may determine whether the modality is equal to a second predetermined state. In one example, the second predetermined state may be a walking state or a state associated with the computing device moving at a walking velocity. In another example, the second predetermined state may be a running state or a state associated with the computing device moving at a running velocity. In another example, the second predetermined state may be the walking state or the running state. If the modality equals the second predetermined state, then the method 1800 may return to block 1801. Otherwise, if the modality does not equal the second predetermined state, at block 1819, the method 1800 may determine whether the GNSS data indicates that a received GNSS signal from the GNSS sensor is weak. In one example, the received GNSS signal may be determined to be weak if the GNSS sensor is not able to acquire three or more satellite vehicles (SVs) with a carrier to noise ratio ($C/N_0$) of greater than twenty decibels (20 dB) or equivalent to a moderate signal strength. In another example, the received GNSS signal may be determined to be weak if the GNSS sensor is not able to determine a velocity from the received GNSS signal. If the received GNSS signal is weak, then the method 1800 may return to block 1811. Otherwise, if the received GNSS signal is not weak, at block 1821, the method 1800 may deactivate the GNSS sensor for a first delay time and return to block 1801. In one example, the first delay time may be one hundred and twenty (120) seconds. In another example, the first delay time may be in the range of thirty (30) seconds to two hundred and forty (240) seconds. In another example, the first delay time may increase after each iteration starting at, for instance, thirty (30) seconds.

In FIG. 18, at block 1831, the method 1800 may determine a percentage of time that the modality is equal to the first state over a measurement period such as sixty (60) seconds or one hundred and twenty (120) seconds. In one example, the method 1800 may determine the percentage of time that the modality is equal to the first state by dividing an accumulated time associated with the computing device being in the first state by a total time of the measurement. In one example, the method 1800 may reset the accumulated time associated with the computing device being in the first state when a waling state or a running state is detected by a modality determination engine. At block 1833, the method 1800 may determine whether the percentage of time that the modality is equal to the first state is at least a first modality percentage threshold. In one example, the first modality percentage threshold may be about sixty-six percent (66%). In another example, the first modality percentage threshold may be in the range of about fifty percent (50%) to about one hundred percent (100%). If the percentage of time that the modality is equal to the first state is less than the first modality percentage threshold, then the method 1800 may wait for the percentage of time that the modality is equal to the first state to be at least the first modality percentage threshold. Otherwise, if the percentage of time that the modality is equal to the first state is at least the first modality percentage threshold, at block 1835, the method 1800 will wait until the modality is the first predetermined state such as an in vehicle state as reported by a modality determination engine. At block 1837, the method 1800 may scan for static APs when the computing device is at different locations. Further, the method 1800 may determine a time duration between successive locations that a scan is performed. The method 1800 may obtain AP identification data such as a service set identification (SSID), a basic service set identification (BSSID), a received signal strength indication (RSSI), other AP information, or combination of AP information from each scanned static AP at each successive location.

In the current embodiment, at block 1839, the method 1800 may request, from a server using a wireless or wired network, successive locations of the computing device based on the scanned static APs. As part of the request for the successive locations of the computing device based on the scanned static APs sent to the server, the method 1800 may provide the SSID, BSSID, RSSI or other information for each scanned static AP to the server. In one example, the server may be associated with a service such as Google Location Service™. In response to the request for the successive locations of the computing device based on the scanned static APs, at block 1841, the method 1800 may receive, from the server, the successive locations of the computing device. At block 1843, the method 1800 may determine a second velocity using a distance between the successive locations of the computing device and the time duration between successive locations. At block 1845, the method 1800 may determine whether the second velocity is at least a second velocity threshold. In one example, the second velocity threshold may be six meters per second (6 m/s) or faster than a typical person may run. In another example, the second velocity threshold may be in the range of five meters per second (5 m/s) to ten meters per second (10 m/s). If the second velocity is at least the second velocity threshold, at block 1871, the method 1800 may report to the requesting application or feature of the second processor or the third processor that the modality of the computing device is in vehicle. Otherwise, if the second velocity is less than the second velocity threshold, then the method 1800 may return to block 1831.

In FIG. 18, at block 1851, the method 1800 may determine whether there is any passive GNSS data. In one definition, passive GNSS data may be GNSS data derived from a request for GNSS data from other than the in vehicle modality algorithm such as from an application or feature of the second processor or the third processor. If there is passive GNSS data, at block 1855, the method 1800 may determine a third velocity using the passive GNSS data. In one example, the third velocity may be determined from the passive GNSS data associated with three (3) consecutive readings of the GNSS sensor. In another example, the third velocity may be determined from the passive GNSS data associated with three (3) readings of the GNSS sensor within a certain period of time such as ten (10) seconds. A person of ordinary skill in the art will recognize various algorithms for determining a velocity from GNSS data. If there is no passive GNSS data, the method 1800 may wait for passive GNSS data. At block 1857, the method 1800 may determine whether the third velocity is at least a third velocity threshold. In one example, the third velocity threshold may be twelve meters per second (12 m/s) or faster than a typical person may run. In another example, the third velocity threshold may be in the range of five meters per second (5 m/s) to fifteen meters per second (15 m/s). If the third velocity is at least the third velocity threshold, at block 1871, the method 1800 may report to the requesting application or feature of the second processor or the third processor that the modality of the computing device is in vehicle. Otherwise, if the third velocity is less than the third velocity threshold, then the method 1800 may return to block 1851.

Figure 19:
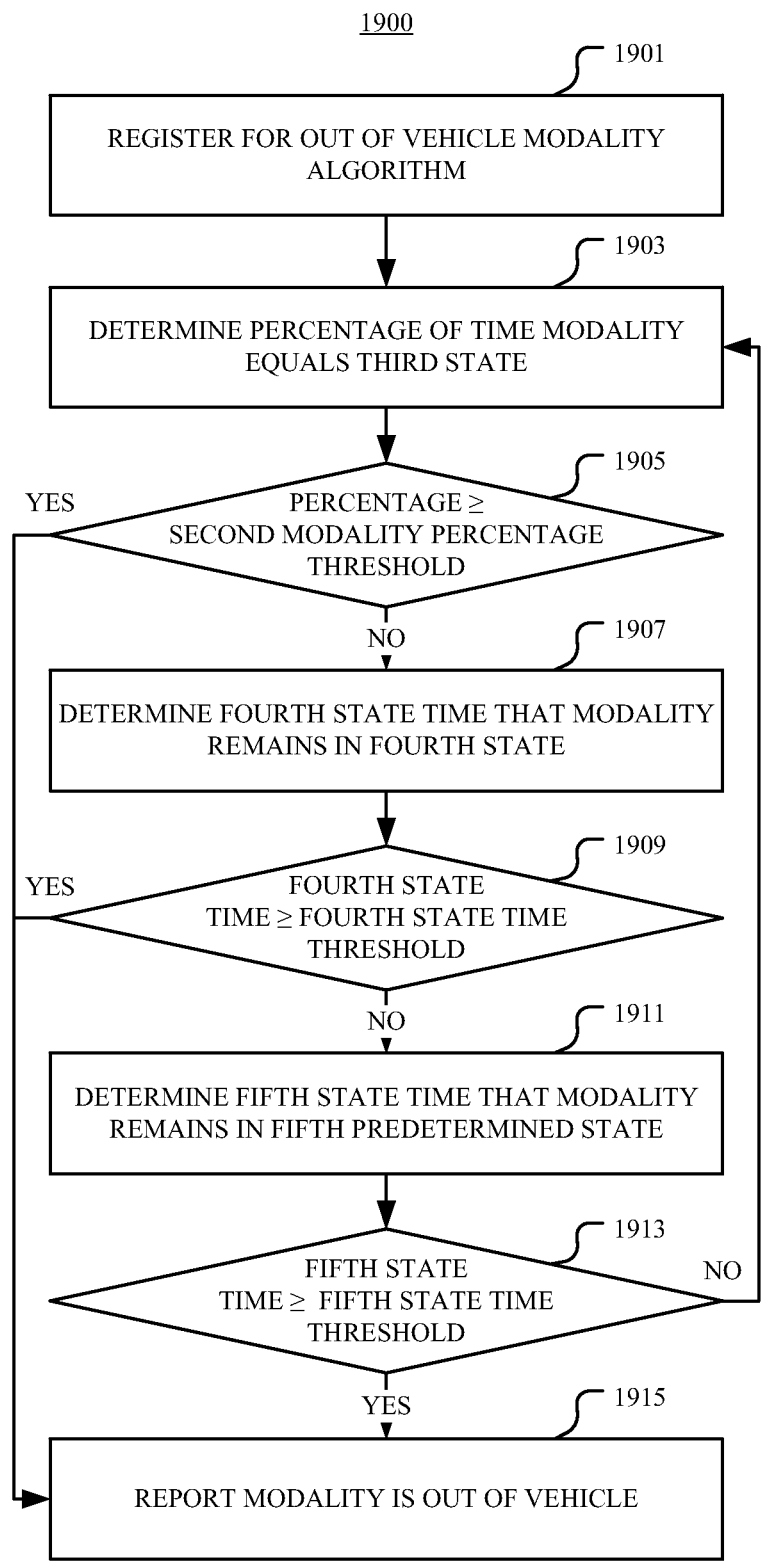
FIG. 19 is a flow chart of one embodiment of a method of determining a modality of out of vehicle for a computing device having a multiple sensor integrated chip architecture with various aspects described herein.

FIG. 19 is a flow chart of one embodiment of a method 1900 of determining a modality of out of vehicle for a computing device having a multiple sensor integrated chip architecture with various aspects described herein. The multiple sensor integrated chip architecture may be similar to the architecture described by FIG. 1B or FIG. 2. Further, the multiple sensor integrated chip architecture may be configured to include a first processor, a second processor, and a third processor. In one example, the method 1900 may be performed by the third processor such as an application processor. In another example, the method 1900 may be performed by the second processor such as an LPC. In another example, the method 1900 may be added to the method 1800. In FIG. 19, the method 1900 may begin at, for instance, block 1901 where it may receive, from an application or feature of the second processor or the third processor, a request to perform an out of vehicle modality algorithm. At block 1903, the method 1900 may determine a percentage of time that the modality is equal to a third state. In one example, the third state may be a walking state or a running state. In one example, the method 1900 may determine the percentage of time that the modality is equal to the third state by dividing an accumulated time associated with the computing device being in the third state by a measurement period such as sixty (60) seconds or one hundred and twenty (120) seconds.

In FIG. 19, at block 1905, the method 1900 may determine whether the percentage of time that the modality is equal to the third state over a measurement period such as sixty (60) seconds or one hundred and twenty (120) seconds is at least a second modality percentage threshold. In one example, the second modality percentage threshold may be about fifty percent (50%). In another example, the second modality percentage threshold may be in the range of about forty percent (40%) to about one hundred percent (100%). If the percentage of time that the modality is equal to the third state is at least the second modality percentage threshold, at block 1915, the method 1900 may report to the requesting application or feature of the second processor or the third processor that the modality of the computing device is out of vehicle. Otherwise, if the percentage of time that the modality is equal to the third state is less than the second modality percentage threshold, at block 1907, the method 1900 may determine a fourth state time that the modality of the computing device remains in the fourth state. In one example, the fourth state may be associated with the computing device being stationary.

In the current embodiment, at block 1909, the method 1900 may determine whether the fourth state time is at least a fourth state threshold. If the fourth state time is at least the fourth state threshold, at block 1915, the method 1900 may report to the requesting application or feature of the second processor or the third processor that the modality of the computing device is out of vehicle. Otherwise, if the fourth state time is less than the fourth state threshold, at block 1911, the method 1900 may determine a fifth state time that the modality of the computing device remains in the fifth state. In one example, the fifth state may be associated with the computing device having micro-motion or an unknown state. In one example, micro-motion may be associated with the computing device having small random movements detected by a sensor. At block 1913, the method 1900 may determine whether the fifth state time is at least a fifth state threshold. If the fifth state time is at least the fifth state threshold, at block 1915, the method 1900 may report to the requesting application or feature of the second processor or the third processor that the modality of the computing device is out of vehicle. Otherwise, if the fifth state time is less than the fifth state threshold, the method 1900 may return to block 1903.

In another embodiment, at a computing device that includes a first processor, a second processor and a third processor, a method may be configured to receive, at the first processor, first sensor data from a first sensor. The method may determine, at the first processor, a motion state of the computing device using the first sensor data. In response to determining that the motion state corresponds to a predetermined motion state, the method may activate the second processor. Further, the method may receive, at the second processor, second sensor data from a second sensor. The method may determine, by the second processor, that the motion state corresponds to the predetermined motion state using the second sensor data. In response to determining that the motion state corresponds to the particular motion state using the second sensor data, the method may send the motion state to the third processor.

In another embodiment, the method may send, by the first processor, the motion state to the third processor.

In another embodiment, the method may send, by the second processor, the motion state to the third processor.

In another embodiment, the method may activate, by the first processor, the third processor.

In another embodiment, the method may receive, by the first processor, from the third processor, a request for the motion state.

In another embodiment, the method may receive, by the second processor, from the third processor, a request for the motion state.

In another embodiment, the method may determine the motion state of the computing device using the first sensor data and a first predetermined signature.

In another embodiment, the method may determine the motion state of the computing device using the second sensor data and a second predetermined signature.

In another embodiment, the method may determine that the motion state corresponds to the predetermined motion state by using the first sensor data of the first sensor and the second sensor data of the second sensor.

In another embodiment, the method may manage, by the first processor, a current consumption of the second processor using the motion state.

In another embodiment, the method may manage, by the first processor, a current consumption of the third processor using the motion state.

In another embodiment, the method may manage, by the second processor, a current consumption of the first processor using the motion state.

In another embodiment, the method may manage, by the second processor, a current consumption of the third processor using the motion state.

In another embodiment, the method may determine, by the first processor, that the motion state corresponds to the computing device being stationary for at least a minimum stationary time.

In another embodiment, the method may determine, by the first processor, that the motion state corresponds to the computing device being in motion for at least a minimum move time.

In another embodiment, the method may designate, at the first processor, a modality of the computing device using the motion state.

In another embodiment, the method may designate, at the second processor, a modality of the computing device using the motion state.

In another embodiment, the first sensor may use less average current consumption than the second sensor.

In another embodiment, the first sensor may be an accelerometer.

In another embodiment, the first sensor may be a gyroscope.

In another embodiment, the second sensor may be a global navigation satellite system (GNSS) sensor.

In another embodiment, the second sensor may be a short range wireless sensor.

In another embodiment, the first processor may be a sensor hub.

In another embodiment, the second processor may be a low-power processor (LPC).

In another embodiment, the third processor is an application processor.

In another embodiment, the method may use a training algorithm and training data to determine the motion state.

In another embodiment, a system may be configured to include a first processor operatively coupled to a first sensor. The system may be configured to include a second processor operatively coupled to the first processor and a second sensor. Further, the system may be configured to include a third processor operatively coupled to the second processor. The first processor may be configured to receive first sensor data from the first sensor. Further, the first processor may determine a motion state of the system using the first sensor data. In response to determining that the motion state corresponds to a predetermined motion state, the first processor may activate the second processor. The second processor may be configured to receive second sensor data from the second sensor. Further, the second processor may be configured to determine that the motion state corresponds to the predetermined motion state using the second sensor data. In response to determining that the motion state corresponds to the predetermined motion state using the second sensor data, the first processor or the second processor may send the motion state to the third processor.

In another embodiment, the system may be configured to include a first processor operatively coupled to a third processor. Further, the first processor may be configured to activate the third processor.

In another embodiment, at a computing device having a first processor, a second processor and a third processor, a method may receive, at the first processor, first sensor data from a first sensor. The method may determine, at the first processor, a motion state of the computing device using the first sensor data. In response to determining that the motion state of the computing device has changed and corresponds to a movement of the computing device, activating, by the first processor, the second processor. The method may determine, by the second processor, that the motion state corresponds to a predetermined motion state using the first sensor data and a first predetermined signature. In response to determining that the motion state corresponds to the predetermined motion state, the method may send the motion state to the third processor.

In another embodiment, a computing device having a first processor, a second processor, a third processor and a first sensor, wherein the first processor is operatively coupled to the second processor and the first sensor, wherein the second processor is operatively coupled to the third processor, wherein the improvement comprises determining, by the first processor and the second processor, that the computing device is in motion using an average current consumption by the first processor, the second processor, the third processor and the first sensor of less than eighteen milliamps (18 mA).

In another embodiment, a computing device having a first processor, a second processor, a third processor and a first sensor, wherein the first processor is operatively coupled to the second processor and the first sensor, wherein the second processor is operatively coupled to the third processor, wherein the improvement comprises determining, by the first processor and the second processor, that the computing device is motionless using an average current consumption by the first processor, the second processor, the third processor and the first sensor of less than seventy microamps (70 uA).

In another embodiment, a computing device having a first processor, a second processor, a third processor and a first sensor, wherein the first processor is operatively coupled to the second processor and the first sensor, wherein the second processor is operatively coupled to the third processor, wherein the improvement comprises determining, by the first processor and the second processor, that the computing device is in motion with an average current consumption by the first processor, the second processor, the third processor and the first sensor of less than eighteen milliamps (18 mA).

In another embodiment, at a computing device that includes a first processor, a second processor and a third processor, a method may perform, at the first processor, an algorithm using a first level of confidence associated with a first sensor. In response to determining that a second level of confidence associated with a second sensor is needed, the method may activate the second processor. Further, the method may determine, by the second processor, a result of the algorithm using the second level of confidence associated with the second sensor. In response to determining that the result of the algorithm corresponds to a predetermined result, the method may send the result of the algorithm to the third processor.

In another embodiment, at a computing device that includes a first processor, a second processor and a third processor, a method may perform, by the second processor, a first scan at a first scan rate for first location data using a sensor. The method may receive, at the second processor, from the sensor, the first location data. Further, the method may determine, by the second processor, a first location using the first location data. The method may receive, by the second processor, a modality of the computing device. In response to determining the first location, the method may determine, by the second processor, that the modality corresponds to a predetermined state. In response to determining that the modality corresponds to the predetermined state, the method may perform, by the second processor, a second scan at a second scan rate for second location data using the sensor.

In another embodiment, the method may determine, by the second processor, the velocity of the computing device using the first location data. Further, the method may determine, by the second processor, the second scan rate based on the velocity of the computing device.

In another embodiment, the predetermined state may be a stationary state.

In another embodiment, the predetermined state may be an in driving state.

In another embodiment, the second scan rate may be based on a velocity of the computing device.

In another embodiment, the predetermined state may be an indoor state.

In another embodiment, the method may decrease, by the second processor, the second scan rate below the first scan rate.

In another embodiment, the predetermined state may be a walking state.

In another embodiment, the second scan rate may be based on a velocity of the computing device.

In another embodiment, the method may activate a third sensor. Further, the method may receive, from the third sensor, sensor data associated with a movement of the computing device. Also, the method may determine a direction of the movement of the computing device using the sensor data.

In another embodiment, the third sensor may be an accelerometer.

In another embodiment, the method may activate a third sensor. The method may receive, from the third sensor, sensor data associated with a movement of the computing device. Further, the method may perform functions associated with a pedometer using the sensor data.

In another embodiment, the method may determine, by the first processor, the modality.

In another embodiment, the method may determine, by the second processor, the modality.

In another embodiment, the first sensor may be a GNSS sensor.

In another embodiment, the first sensor may be a short range wireless sensor.

In another embodiment, at a computing device that includes a first processor, a second processor and a third processor, a method may receive, by the first processor operating at a first clock rate, first sensor data from a first sensor operating at a first data rate. The method may determine, by the first processor, a movement of the computing device using the first sensor data. In response to determining the movement of the computing device, the method may perform, by the first processor, a first motion state algorithm to determine whether a modality of the computing device is a first motion state. In response to determining that the modality of the computing device is not the first motion state, the method may change, by the first processor, at least one of the first processor to operate at a second clock rate sufficient to perform a second motion state algorithm and changing the first sensor to operate at a second data rate sufficient to perform the second motion state algorithm. Further, the second motion state algorithm may be used to determine whether the modality of the computing device is a second motion state.

In another embodiment, at least one of the second processor and the third processor may be in a low power mode.

In another embodiment, the method may determine, by the first processor, that the modality of the computing device is the second motion state. Further, the method may send, by the first processor, the modality to at least one of the second processor and the third processor.

In another embodiment, in response to determining that the modality of the computing device is the second motion state, the method may activate, by the first processor, at least one of the second processor and the third processor.

In another embodiment, the method may determine, by the first processor, that the modality of the computing device is not the second motion state. In response to determining that the modality of the computing device is not the second motion state, the method may change, by the first processor, at least one of the first processor to operate at the first clock rate sufficient to perform the first motion state algorithm and changing the first sensor to operate at the first data rate sufficient to perform the first motion state algorithm.

In another embodiment, the second clock rate may be greater than the first clock rate.

In another embodiment, the second clock rate may be about fifty percent (50%) greater than the first clock rate.

In another embodiment, the second data rate may be greater than the first data rate.

In another embodiment, the second data rate may be about fifty percent (50%) greater than the first data rate.

In another embodiment, the first motion state may be associated with the computing device being stationary and the second motion state may be associated with the computing device moving at a walking speed.

In another embodiment, the first motion state may be associated with the computing device moving at a walking speed and the second motion state may be associated with the computing device moving at a running speed.

In another embodiment, the first motion state may be associated with the computing device moving at a running speed and the second motion state may be associated with the computing device moving at a vehicle speed.

In another embodiment, the first sensor may be an accelerometer.

In another embodiment, in response to determining the movement of the computing device, the method may change, by the first processor, at least one of the first processor to operate at a third clock rate sufficient to perform the first motion state algorithm and the first sensor to operate at a third data rate sufficient to perform the first motion state algorithm.

In another embodiment, the third clock rate may be greater than the first clock rate.

In another embodiment, the third clock rate may be and less than the second clock rate.

In another embodiment, the third data rate may be greater than the first data rate and less than the second data rate.

In another embodiment, at a computing device that includes a first processor, a second processor and a third processor, a method may receive, by the first processor, sensor data from a first sensor. The method may determine, by the first processor, a movement by the computing device using the sensor data. Further, the method may receive, by the first processor, a modality of the computing device. In response to determining that the modality corresponds to a predetermined state, determining, by the first processor, a modality move distance associated with the predetermined state. The method may determine, by the first processor, a move distance of the computing device using the modality move distance. Also, the method may determine, by the first processor, that the move distance of the computing device is at least a move distance threshold. In response to determining that the move distance of the computing device is at least a move distance threshold, reporting, by the first processor, to at least one of the second processor and the third processor, that the move distance of the computing device is at least the move distance threshold.

In another embodiment, the method may receive, by the first processor, from at least one of the second processor and the third processor, a request to perform an accumulated movement algorithm.

In another embodiment, the method may receive the request to perform the accumulated movement algorithm including receiving the move distance threshold.

In another embodiment, the modality move distance may be a product of the duty cycle of an accumulated movement algorithm and a velocity of the predetermined state.

In another embodiment, the method may request, by at least one of the second processor and the third processor, a global navigational satellite system (GNSS) position from a second sensor. The method may receive, by at least one of the second processor and the third processor, the GNSS position from the second sensor. Further, the method may determine, by at least one of the second processor and the third processor, a move distance threshold from the GNSS position to a geofence boundary. Also, the method may send, by at least one of the second processor and the third processor, to the first processor, a request to perform an accumulated movement algorithm In another embodiment, the method may send the request to perform the accumulated movement algorithm including sending the move distance threshold.

In another embodiment, the method may report includes reporting the move distance.

In another embodiment, the first sensor may be an accelerometer.

In another embodiment, at a computing device that includes a first processor, a second processor and a third processor, a method may determine, by the second processor, a percentage of time that a modality of the computing device is a first predetermined state. In response to determining that the percentage of time that the modality of the computing device is the first predetermined state is at least a first modality percentage threshold, the method may perform, by the second processor, a first scan at a first time of first available access points (APs) using a sensor. The method may receive, at the second processor, first AP identification data for each first available AP using the sensor. Further, the method may send, from the second processor, to a server, the first AP identification data. The method may receive, at the second processor, from the server, a first location of the computing device associated with the first time. Also, the method may perform, by the second processor, a second scan at a second time of the second available APs using the sensor. The method may send, from the second processor, to the server, the second AP identification data. The method may receive, at the second processor, from the server, a second location of the computing device associated with the second time. Further, the method may determine, by the second processor, a velocity of the computing device using at least one of the first location, the second location, the first time and the second time. In response to the velocity of the computing device being at least a predetermined velocity threshold, reporting, by the second processor, to the third processor, that the modality is in vehicle.

In another embodiment, the first AP identification data may include at least one of a received signal strength indicator (RSSI), a service set identifier (SSID) and a basic service set identifier (BSSID).

In another embodiment, the second AP identification data may include at least one of a received signal strength indicator (RSSI), a service set identifier (SSID) and a basic service set identifier (BSSID).

In another embodiment, the method may determine, by the second processor, that the computing device is communicatively coupled to the first static AP using the sensor.

In another embodiment, the method may perform the first scan at the first time of first available APs while the modality is the first predetermined state.

In another embodiment, the method may perform the second scan at the second time of second available APs while the modality is the first predetermined state.

In another embodiment, in response to the velocity of the computing device being at least a certain velocity threshold, the method may activate, by the second processor, the third processor.

In another embodiment, the first predetermined state may be an in vehicle state.

In another embodiment, the first modality percentage threshold may be in the range of about fifty percent (50%) to about one hundred percent (100%).

In another embodiment, the predetermined velocity threshold may be in the range of five meters per second (5 m/s) to ten meters per second (10 m/s).

In another embodiment, at a computing device that includes a first processor, a second processor and a third processor, a method may determine, by the second processor, that a modality of the computing device is a first predetermined state. In response to determining that the modality is the first predetermined state, the method may receive, by the second processor, sensor data from a sensor. The method may determine, by the second processor, a velocity of the computing device using the sensor data. Further, the method may determine, by the second processor, that the velocity of the computing device is at least a predetermined velocity threshold. In response to determining that the velocity of the computing device is at least the predetermined velocity threshold, the method may report, by the second processor, to the third processor, that the modality of the computing device is in vehicle.

In another embodiment, the first predetermined state may be an in vehicle state.

In another embodiment, the sensor may be a GNSS sensor.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. This disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Furthermore, the term "connected" means that one function, feature, structure, component, element, or characteristic is directly joined to or in communication with another function, feature, structure, component, element, or characteristic. The term "coupled" means that one function, feature, structure, component, element, or characteristic is directly or indirectly joined to or in communication with another function, feature, structure, component, element, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the modality to be directed to a singular form. References to "one embodiment," "an embodiment," "example embodiment," "various embodiments," and other like terms indicate that the embodiments of the disclosed technology so described may include a particular function, feature, structure, component, element, or characteristic, but not every embodiment necessarily includes the particular function, feature, structure, component, element, or characteristic. Further, repeated use of the phrase "in one embodiment" does not necessarily refer to the same embodiment, although it may.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

This detailed description is merely illustrative in nature and is not intended to limit the present disclosure, or the application and uses of the present disclosure. Furthermore, there is no intention to be bound by any expressed or implied theory presented in the preceding field of use, background, or this detailed description. The present disclosure provides various examples, embodiments and the like, which may be described herein in terms of functional or logical block elements. Various techniques described herein may be used for low-power management of multiple sensor integrated chip architecture for a computing device. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like. Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a non-transitory computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

What is claimed is:

1. A method, comprising:
at a computing device that includes a first processor, a second processor and a third processor,
receiving, by the first processor operating at a first clock rate, first sensor data from a first sensor operating at a first data rate;
determining, by the first processor, a movement of the computing device using the first sensor data;
in response to determining the movement of the computing device, performing, by the first processor, a first motion state algorithm to determine whether a modality of the computing device is a first motion state;
in response to determining that the modality of the computing device is not the first motion state, changing, by the first processor, at least one of the first processor to operate at a second clock rate sufficient to perform a second motion state algorithm and changing the first sensor to operate at a second data rate sufficient to perform the second motion state algorithm, wherein the second motion state algorithm is used to determine whether the modality of the computing device is a second motion state;
determining, by the first processor, that the modality of the computing device is the second motion state; and
sending, by the first processor, the modality to at least one of the second processor and the third processor.

2. The method of claim 1, wherein at least the second processor and the third processor are in a low power mode.

3. The method of claim 1, further comprising:
in response to determining that the modality of the computing device is the second motion state, activating, by the first processor, at least one of the second processor and the third processor.

4. The method of claim 1, wherein the second clock rate is greater than the first clock rate.

5. The method of claim 1, wherein the second clock rate is about fifty percent (50%) greater than the first clock rate.

6. The method of claim 1, wherein the second data rate is greater than the first data rate.

7. The method of claim 1, wherein the second data rate is about fifty percent (50%) greater than the first data rate.

8. The method of claim 1, wherein the first motion state is associated with the computing device being stationary and the second motion state is associated with the computing device moving at a walking speed.

9. The method of claim 1, wherein the first motion state is associated with the computing device moving at a walking speed and the second motion state is associated with the computing device moving at a running speed.

10. The method of claim 1, wherein the first motion state is associated with the computing device moving at a running speed and the second motion state is associated with the computing device moving at a vehicle speed.

11. The method of claim 1, wherein the first sensor is an accelerometer.

12. The method of claim 1, wherein the first processor is a sensor hub.

13. The method of claim 1, wherein the second processor is a low power processor (LPC).

14. The method of claim 1, wherein the third processor is an application processor.

15. A method, comprising:
at a computing device that includes a first processor, a second processor and a third processor,
receiving, by the first processor operating at a first clock rate, first sensor data from a first sensor operating at a first data rate;
determining, by the first processor, a movement of the computing device using the first sensor data;
in response to determining the movement of the computing device, performing, by the first processor, a first motion state algorithm to determine whether a modality of the computing device is a first motion state;
in response to determining that the modality of the computing device is not the first motion state, changing, by the first processor, at least one of the first processor to operate at a second clock rate sufficient to perform a second motion state algorithm and changing the first sensor to operate at a second data rate sufficient to perform the second motion state algorithm, wherein the second motion state algorithm is used to determine whether the modality of the computing device is a second motion state;
determining, by the first processor, that the modality of the computing device is not the second motion state; and
in response to determining that the modality of the computing device is not the second motion state, changing, by the first processor, at least one of the first processor to operate at the first clock rate sufficient to perform the first motion state algorithm and changing the first sensor to operate at the first data rate sufficient to perform the first motion state algorithm.

16. A method, comprising:
at a computing device that includes a first processor, a second processor and a third processor,
receiving, by the first processor operating at a first clock rate, first sensor data from a first sensor operating at a first data rate;
determining, by the first processor, a movement of the computing device using the first sensor data;
in response to determining the movement of the computing device, performing, by the first processor, a first motion state algorithm to determine whether a modality of the computing device is a first motion state;
in response to determining that the modality of the computing device is not the first motion state, changing, by the first processor, at least one of the first processor to operate at a second clock rate sufficient to perform a second motion state algorithm and changing the first sensor to operate at a second data rate sufficient to perform the second motion state algorithm, wherein the second motion state algorithm is used to determine whether the modality of the computing device is a second motion state; and
in response to determining the movement of the computing device, changing, by the first processor, at least one of the first processor to operate at a third clock rate sufficient to perform the first motion state algorithm and the first sensor to operate at a third data rate sufficient to perform the first motion state algorithm.

17. The method of claim 16, wherein the third clock rate is greater than the first clock rate.

18. The method of claim 16, wherein the third clock rate is and less than the second clock rate.

19. The method of claim 16, wherein the third data rate is greater than the first data rate and less than the second data rate.

* * * * *